(12) United States Patent
Uga et al.

(10) Patent No.: US 6,718,326 B2
(45) Date of Patent: Apr. 6, 2004

(54) PACKET CLASSIFICATION SEARCH DEVICE AND METHOD

(75) Inventors: Masanori Uga, Tokyo (JP); Kohei Shiomoto, Iruma (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 427 days.

(21) Appl. No.: 09/927,284

(22) Filed: Aug. 10, 2001

(65) Prior Publication Data

US 2002/0023080 A1 Feb. 21, 2002

(30) Foreign Application Priority Data

Aug. 17, 2000 (JP) .................................. 2000-247741
Feb. 26, 2001 (JP) .................................. 2001-050581

(51) Int. Cl.[7] .............................................. G06F 17/30
(52) U.S. Cl. ............................... 707/6; 707/3; 707/7
(58) Field of Search ................. 707/3, 6, 7; 370/389, 370/392, 401, 412; 709/220–225; 711/108

(56) References Cited

U.S. PATENT DOCUMENTS 6,415,354 B1 * 7/2002 Joffe et al. .................. 711/108
6,484,170 B2 * 11/2002 Abdat ............................ 707/6
6,631,466 B1 * 10/2003 Chopra et al. ................. 707/6

OTHER PUBLICATIONS

"Design of Multi–Field IPv6 Packet Classifiers Using Teritary CAMs"—Nenn–Fu Huang, Whai–En Chen, Jiau–Yu Luo, and Jun–M Chen—Sep. 2001 IEEE (pps: 1877–1881).*

"A Modular Approach to Packet Classification: Algorithms and Results"—Thomas Y.C. Woo—May 2000 IEEE (pps: 1213–1222 from (IEEE INFOCOM 2000).*

"Packet Classification on Multiple Fields", Pankaj Gupta and Nick Mckeown, Proceedings of ACM SIGCOMM'99 conference on Applications, technologies, architectures, and protocols for computer communications, Aug. 30–Sep. 3, 1999, pp. 147–160, Cambridge United States.

* cited by examiner

Primary Examiner—Kim Vu
Assistant Examiner—Anh Ly
(74) Attorney, Agent, or Firm—Darby & Darby

(57) ABSTRACT

A packet classification search device and method are implemented which are capable of searching rules of packet classification having very long search bit width at high speed while using a CAM which has a limited bit width. The fields of rules of packet classification are grouped into groups, and the grouped fields of each rule are stored along with search related information (except for the initial group) and number of searches information in a CAM. The next number of searches information (if further groups exist which must be searched), comparison related information, and actions related to packets (if further groups exist which must be searched, directing searching again, while if no further groups exist which must be searched, actions for packet classification) are stored in a search result storage device. By doing this it is made possible to search with the bit width of the group unit.

13 Claims, 18 Drawing Sheets

FIG. 3

| | GROUP NUMBER 0 | | | GROUP NUMBER 1 | | |
| --- | --- | --- | --- | --- | --- | --- |
| RULE NUMBER | DESTINATION ADDRESS | Protocol | SOURCE ADDRESS | DESTINATION PORT NUMBER | | ACTION |
| 0 | 59.48/16 | UDP | 192.168/16 | * | | FORWARD WITH HIGH PRIORITY |
| 1 | 59.48/16 | TCP | 122.58.33/24 | 10 | | FORWARD WITH MEDIUM PRIORITY |
| 2 | 59.48/16 | UDP | 122.58.33/24 | * | | FORWARD WITH LOW PRIORITY |
| 3 | 122.58.33/24 | UDP | * | * | | DENY |

*: MEANS "DON'T CARE"

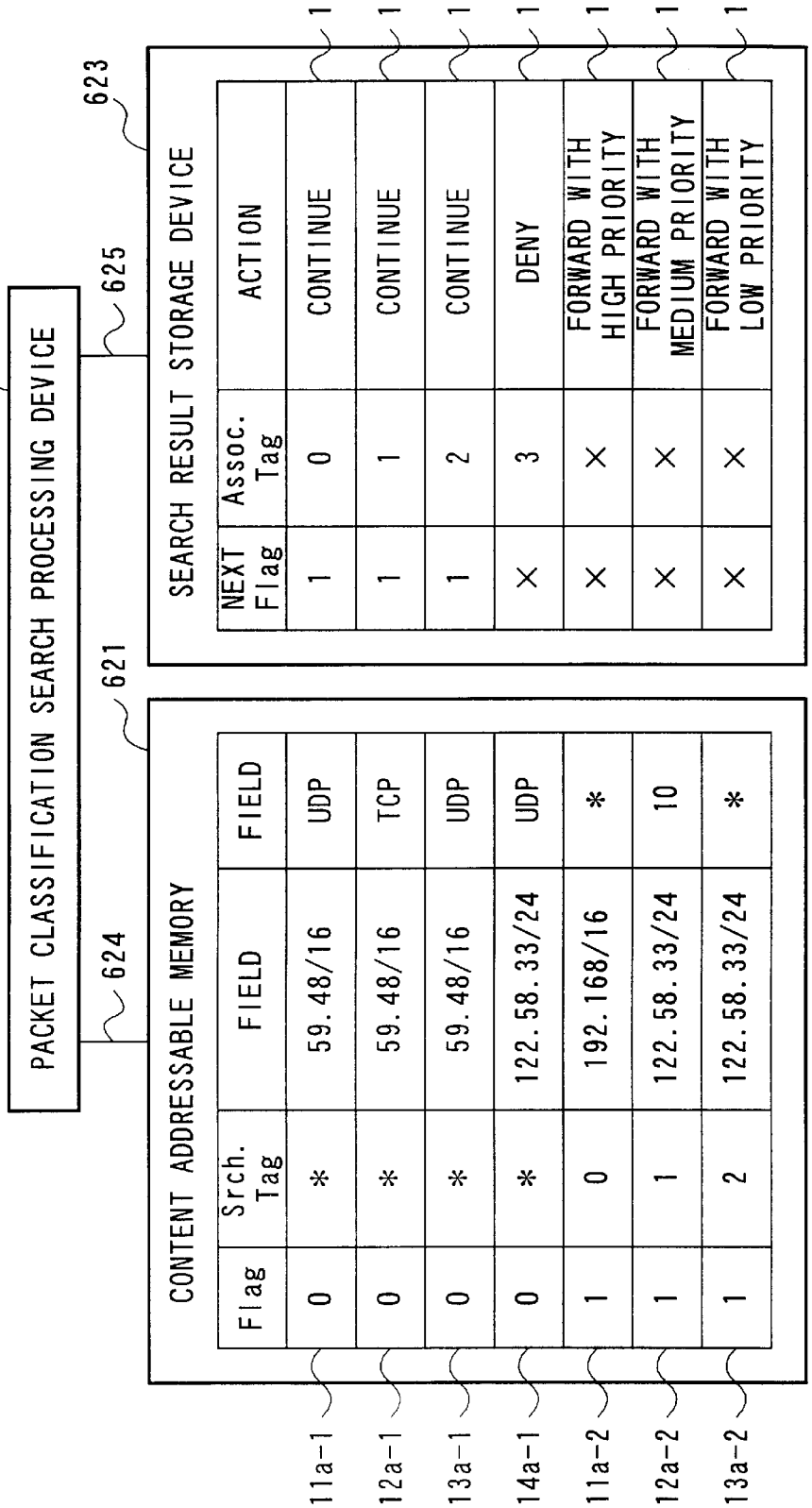

FIG. 5

Original rule table

| DA 128bits | SA 128bits | DP 16bits | SP 16bits | PID 8bits | DSCP 8bits | ACTION |
|---|---|---|---|---|---|---|
| | | | | | | |
| | | | | | | |

Proposed rule table

| Srch Tag | DA/SA 128bits | DP/SP 16bits | PID/DSCP 8bits | Flag (1st/2nd) | Assoc Tag | ACTION |
|---|---|---|---|---|---|---|
| | | | | | | |
| | | | | | | |

FIG. 6

Original rule table

| | DA 128bits | SA 128bits | ACTION |
|---|---|---|---|
| A | 1100 | 111* | Deny |
| B | 010* | 010* | High Priority |
| C | 10* | 10* | Medium Priority |
| D | 111* | * | Low Priority |

Proposed rule table

| | Srch Tag | DA/SA 128bits | Flag (1st/2nd) | Assoc Tag | ACTION |
|---|---|---|---|---|---|
| A(1st) | Any | 1100 | 1st | 1 | Continue |
| B(1st) | Any | 010* | 1st | 2 | Continue |
| C(1st) | Any | 10* | 1st | 3 | Continue |
| D(1st) | Any | 111* | 1st | 4 | Continue |
| A(2nd) | 1 | 111* | 2nd | 1 | Deny |
| B(2nd) | 2 | 010* | 2nd | 2 | High Priority |
| C(2nd) | 3 | 10* | 2nd | 3 | Medium Priority |
| D(2nd) | 4 | * | 2nd | 4 | Low Priority |

FIG. 11

Original rule table

| | DA 128bits | SA 128bits | ACTION |
|---|---|---|---|
| A | 11* | 01* | Deny |
| B' | 11* | 11* | High Priority | ← Guard rule
| B | 1* | 11* | High Priority |

FIG. 12

Packet header
DA=1100
SA=1100

Original rule table

| | DA 128bits | SA 128bits | ACTION |
|---|---|---|---|
| A | 11* | 01* | Deny |
| B' | 11* | 11* | High Priority | ← Guard rule
| B | 1* | 11* | High Priority |

Proposed rule table

| | Srch Tag | DA/SA 128bits | Flag (1st/2nd) | Assoc Tag | ACTION |
|---|---|---|---|---|---|
| A,B'(1st) | Any | 11* | 1st | 1 | Continue |
| B(1st) | Any | 1* | 1st | 2 | Continue |
| A(2nd) | 1 | 01* | 2nd | 1 | Deny |
| B'(2nd) | 1 | 11* | 2nd | 1 | High Priority |
| B(2nd) | 2 | 11* | 2nd | 2 | High Priority |

FIG. 20

| DESTINATION ADDRESS | Protocol | SOURCE ADDRESS | DESTINATION PORT NUMBER | ACTION |
|---|---|---|---|---|
| 59.48/16 | UDP | 192.168/16 | * | FORWARD WITH HIGH PRIORITY |
| 59.48/16 | TCP | 122.58.33/24 | 10 | FORWARD WITH MEDIUM PRIORITY |
| 59.48/16 | UDP | 122.58.33/24 | * | FORWARD WITH LOW PRIORITY |
| 122.58.33/24 | UDP | * | * | DENY |

*: MEANS "DON'T CARE"

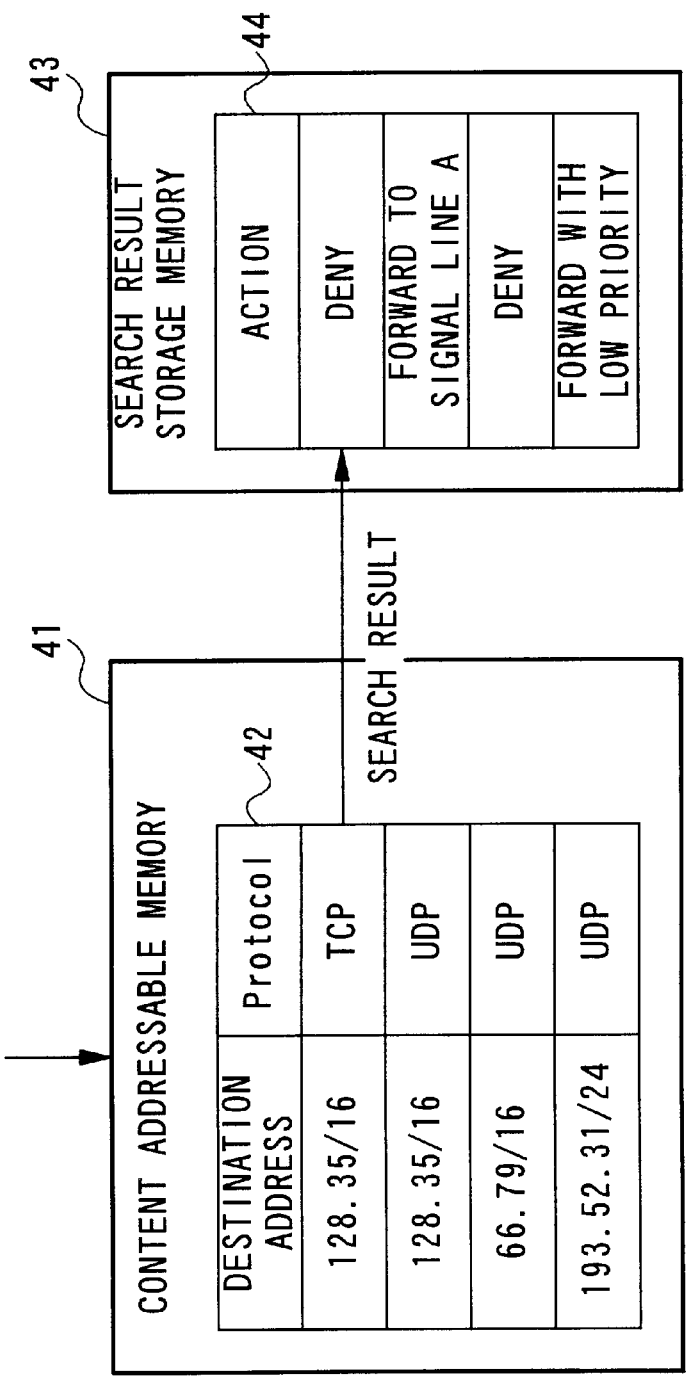

PACKET CLASSIFICATION SEARCH DEVICE AND METHOD

BACKGROUND OF THE INVENTION

1. Field of the Invention

The present invention relates to a packet classification search device and method for performing packet transmission processing in a packet transmission device such as an IP (Internet Protocol) router or the like, which classify what type of processing to perform upon packets such as IP packets from information such as header information included in these packets; and in particular relates to a search technique for tables or the like which are searched when determining upon the processing to apply to the packets.

2. Description of the Related Art

In the past, in a packet transmission device such as an IP router or the like, a routing table has been searched based upon destination addresses which are included in the packet headers to determine the next route. The relationship between the destination address and the next route is stored in the routing table. With conventional networks such as the Internet, only simple transmission processing has been performed in this manner, using only the destination address. This point will now be explained in the following by giving a concrete structural example.

FIG. 19 shows how an IP packet or the like carrying data is transmitted, and in this figure the reference symbols 2-1, 2-2, and 2-3 denote networks which are connected to a router 1, while 3-1, 3-2, and 3-3 denote signal lines which connect the router 1 and the networks 2-1, 2-2, and 2-3, and the reference symbol 4 denotes an IP packet. Furthermore, the reference symbols 5-1, 5-2, ... 5-A are terminals which are present in the network 2-1, the reference symbols 6-1, 6-2, ... 6-B are terminals which are present in the network 2-2, and the reference symbols 7-1, 7-2 ... 7-C are terminals which are present in the network 2-3 (where A, B, and C are any integers greater than or equal to 2).

Furthermore, as is customary, the network addresses in FIG. 19 are separated by "." characters into groups of 8 bits each of which is expressed in decimal, and the number after the "/" shows, in the IP address, how many bits from the most significant bit is to be taken as the network address.

The IP packet 4 contains the IP address of the terminal which is scheduled as its destination, and data. In the past, the router 1 has only searched for the destination IP address contained in the IP header of the IP packet 4, and has decided based thereupon from which signal line to forward the IP packet.

However, in recent years, along with the expansion of the Internet, the conventional type of simple transmission processing using only the destination IP address has proved to be insufficient, and a higher degree of transmission control has become necessary. For example, in order to provide diversification of service upon a data network and in order to address problems of security, attention has focused upon packet classification which performs various procedures for QoS (Quality of Service) control or policy control by searching not only the destination IP addresses which are included in the IP headers of the packets, but also the source IP addresses or other information (such as the TCP (Transmission Control Protocol)/UDP (User Datagram Protocol), port number, or the like), and furthermore by searching not only the IP headers but also other header information within the packets, and by identifying the packets in more detail. Thus by packet classification is meant performing different processing for each flow of IP packets, in order to implement IP value added services such as QoS, VPN (Virtual Private Network), firewalls and the like.

The router classifies the packets in detail by packet classification, and may implement value added services by forwarding packets while allocating priority to them according to contract, or may implement discarding of packets from malicious users. In more concrete terms, it is possible to implement QoS control by performing priority control of the packets based upon the source addresses of their users and their TCP/UDP port numbers, in order to enhance the QoS of packet transmission of specified applications from specified users. Furthermore, if specified applications are to be prevented from communication and their packets are to be discarded, it is possible to implement policy control by filtering so as not to transmit packets which have the TCP/UDP port numbers which are allocated to these applications. A rule table (also termed a "policy table") which will be described hereinafter is searched for rules required for this type of procedure.

Six representative ones of the various fields (field information in packet headers) for classifying packets are: destination address (DA), source address (SA), protocol identifier (PID), destination port number (DP), source port number (SP), and differentiated service code point (DSCP). And the combinations of information corresponding to these fields and actions with regard to the packets (forward at high priority, forward at medium priority, forward at low priority, denying etc.) are hereinafter termed rules (or policies), and these rules are mainly determined and set into the router by the network administrator.

FIG. 20 shows an example of rules for packet classification based upon the network structure of FIG. 19, and in this figure the reference symbol 10 denotes the rule table, while the reference symbols 11, 12, 13, and 14 are rules. The rule table 10 is searched with a plurality of fields in the packet header as search keys, and it is used for determining the action to be applied to these packets. If these rules 11 through 14 are set into the router 1 of FIG. 19, when for example a packet using the UDP protocol and whose destination port number is 100 is forwarded from the terminal 5-1 of the network 2-1 to the terminal 7-1 of the network 2-3, since all the fields (the destination address, the source address, the protocol, and the destination port number) of this packet agree with rule 11 (however, the "destination port number" of rule 11 is "don't care" and thus matches anything), therefore the router 1 performs the action described by the "Action" of rule 11 upon this packet. In other words, the router 1 forwards this packet with high priority.

FIG. 21 shows an example of the structure of an IP packet and the main header information. Although this IP packet is principally composed of a local network header 21, an IP header 22, an upper-layer header 23 (in the figure termed a TCP header), user data (in the figure termed TCP data), and a local network trailer 25, a plurality of fields which are present in each header have the possibility of being used in packet classification.

Along with increase of the degree of attention given to packet classification, the requirement for more detailed classification of the packets has increased, and the number of fields in the header which are to be searched has also increased. Furthermore, in recent years, with the commencement of the introduction of the new IPv6 protocol, the destination IP address and the source IP address are both 128 bits long, so that the number of bits has greatly increased in comparison with the previous IPv4 protocol in which these addresses were 32 bits long. The increase in the number of fields and the increase in the number of search bits for packet classification due to the introduction of the IPv6 protocol have made it necessary in present conditions to search around 400 bits.

During the searching of the rule table, it is necessary to search through the rules (also termed entries) which are made up from this entire field information for the field which most closely resembles or agrees with the header information of the packet which is the subject. As one method for performing this type of search, the method of searching through the entire rule table from top to bottom may be considered. However, with this method, when the rules in the rule table become longer (the number of bits in each rule increases), the problem arises that a much longer time period is required for the search.

Due to this, in the past, as packet classification search methods, there have been employed the method of using a tree structure like a binary search tree, or the method of using a CAM (Content Addressable Memory), the application of which has become more common in recent years.

The problems when searching an IP address using a tree structure will be explained with reference to FIG. 22 which shows examples of tree structure. In this figure, the reference symbol 31 denotes a tree structure in the case of the IPv4 protocol, while the reference symbol 32 denotes a tree structure in the case of the IPv6 protocol; and, if these trees are used, when the search bit length becomes great as with the IPv6 protocol, the tree depth is increased by a corresponding amount, and the number of times searching must be performed increases, so that the number of times the memory is referred to increases, and the problem arises that the speed of search becomes slower. In particular, since when implementing packet classification not only the IP address but also other fields are necessary, the tree becomes longer to the same extent that the fields increase, and the problem arises that the speed of the search becomes slower.

FIG. 23 shows the outline of packet classification using a content addressable memory, and in this figure the reference symbol 41 denotes a content addressable memory, the reference symbol 42 denotes rules stored in this content addressable memory 41, and the reference symbol 43 is a search results storage memory which stores actions which correspond to these rules, while the reference symbol 44 denotes actions for search results stored in this search result storage memory 43.

The rules 42 are stored in the content addressable memory 41, and the actions 44 which correspond to the rules 42 are stored in the search result storage memory 43. The searching is performed by inputting the fields which are to be searched into the content addressable memory 41 and searching through them, and after this search, if the fields which have been inputted match any one of the rules, the search result storage memory 43 is inspected for a stored action which corresponds to the rule which has matched, and the required action is performed upon the packet.

A content addressable memory is a memory device that is not accessed with addresses as search keys, but can be accessed with the values which are recorded in its addresses as search keys, and its distinguishing characteristic is that it compares all at one time the entire set of data fields which are stored in the content addressable memory with the data fields which has been inputted and is the subject of search. In a content addressable memory ternary notation is employed, in which not only are binary values '0' and '1' stored at each address, but also some fields may be expressed as 'don't care' which agrees with both '0' and '1'. It becomes possible to perform searching of a rule table at extremely high speed by using a content addressable memory (TCAM) of this ternary type. However, the bit width which can be searched in such a content addressable memory is limited, and no content addressable memory exists at the present time in which it is possible to perform searching for around 400 bits such as has currently become necessary, as has been explained above, so that there has been the problem that it has not been possible to perform the packet classification for packets in accordance with the IPv6 protocol.

Furthermore, a TCAM or CAM memory device is different from SRAM (Static Random Access Memory) or DRAM (Dynamic Random Access Memory), in which capacity extension in the horizontal direction is not applicable. This is due to differences in the access methods for TCAMs and CAMs, as compared to those for SRAMs and DRAMs. Since SRAMs and DRAMs are accessed by addresses, when extending them in the horizontal direction, they are subdivided into a plurality of banks, and it is easily possible to implement extension in the horizontal direction by feeding in the same address signal to each memory bank.

By contrast to this, since TCAMs and CAMs are accessed by the contents which are stored in them, it is not possible to obtain the desired results, even if the contents are subdivided in the horizontal direction and are stored in a plurality of banks of TCAMs or CAMs, since no association can be established between the TCAMs or CAMs.

In recent years increase of the horizontal width of the rule table has steadily progressed, and this type of problem has become more and more manifest. For example, the horizontal width of the rule table has increased due to the advance in rules for packet classification which causes requirements for header information of higher layers, and the use of the long addresses (128 bits) of the IPv6 protocol etc. In the case of the IPv6 protocol, even with only the above described six fields, SA consists of 128 bits, DA consists of 128 bits, SP consists of 16 bits, DP consists of 16 bits, PID consists of 8 bits, and DSCP consists of 8 bits, so that the total consists of 304 bits. Furthermore, when other fields than these are also added, the width of the rule table can easily become around 400 bits, as described above.

SUMMARY OF THE INVENTION

The objective of the present invention is to solve the above described problems, and to implement a packet classification search device and method which can search through rules for packet classification whose bit width is extremely great.

In order to solve the above described problems, the packet classification search device according to the present invention is one which, based upon fields included in packets which are used to classify the flow of the packets, searches through a rule table comprising a plurality of rules which combine the fields and actions to be performed in relation to packets of which the flow is classified by the fields, and determines actions to be performed in relation to the packets, comprising: a content addressable memory which combines and stores grouped fields which have been grouped from fields included in the rules into a plurality of groups determined in advance, and number of searches information and search related information which respectively show the groups and the rules to which the grouped fields are related;

a search result storage device which stores, in correspondence to the combinations which are stored in the content addressable memory, actions which are to be performed when combinations of grouped fields, number of searches information and search related information that have been inputted to the content addressable memory are found in the content addressable memory, and comparison related information which show the rules to search when next searching in the content addressable memory; and: a processing device which: extracts the fields from packets which have been inputted and generates the grouped fields; inputs into the content addressable memory and searches the number of searches information and the search related information which show the groups and rules which should be searched, and the grouped fields which correspond to the groups; obtains the actions and the comparison related information which are stored in the search result storage device in correspondence to combinations which have been searched in the content addressable memory; and, until the details of the actions which are to be performed as the actions upon the packets are obtained, again inputs to the content addressable memory the number of searches information which shows the groups which should next be searched, the grouped fields which correspond to the groups, and the comparison related information which has been obtained, and performs the searching again.

Furthermore, the packet classification search method according to the present invention is one which, based upon fields included in packets which are used to classify the flow of the packets, searches through a rule table comprising a plurality of rules which combine the fields and actions to be performed in relation to packets of which the flow is classified by the fields, and determines actions to be performed in relation to the packets, comprising the steps of: a step of providing a content addressable memory to combine and store grouped fields which have been grouped from fields included in the rules into a plurality of groups determined in advance, and number of searches information and search related information which respectively show the groups and the rules to which the grouped fields are related, and of providing a search result storage device which stores, in correspondence to the combinations which are stored in the content addressable memory, actions which are to be performed when combinations of grouped fields, number of searches information and search related information that have been inputted to the content addressable memory are found in the content addressable memory, and comparison related information which show the rules to search when next searching in the content addressable memory; a step of extracting the fields from packets which have been inputted and generating the grouped fields; a step of inputting into the content addressable memory and searching the grouped fields which correspond to the groups which are to be initially searched and number of searches information which designates the groups; a step of obtaining the actions and the comparison related information which are stored in the search result storage device in correspondence to search results which have been outputted from the content addressable memory; a step of, if the action which has been obtained shows re-searching of the content addressable memory, again inputting number of searches information which shows the groups which should next be searched, the grouped fields which correspond to the groups and search related information which has the same contents as the comparison related information which has been obtained to the content addressable memory and performing searching; and a step of, if the actions show details of actions which are to be performed upon the packets which are inputted, terminating the searching of the content addressable memory and outputting the details of the actions.

In this manner, with the present invention, the fields which are included in each rule of the original rule table are grouped into a plurality of groups and are stored in the content addressable memory, in order to store the fields in the content addressable memory of which the bit width which can be searched is limited. At this time, the number of searches information is stored together therewith, in order for each group to show in which position the original rule was located. Furthermore, the search related information is also stored together therewith, in order to show that each of those groups is related to the original rules.

When searching the content addressable memory in which the grouped rule table is stored, the content addressable memory is searched a plurality of times. The maximum number of times that the content addressable memory is searched is the number of groups of fields of rules which are included in the original rule table. Each time the content addressable memory is searched, the content addressable memory is searched with the information which is included in the header of the packet and the like, the number of searches information, and the search related information as search keys. Here, the number of searches information is information which shows which number search this one is. The comparison related information in the search result storage device which was obtained when searching in the previous round of searching is used as search related information in this round of searching. In the initial round of searching, it is arranged that this search related information matches any of the search related information which is to be the object of initial searching in the content addressable memory. In concrete terms, along with setting "don't care" to the search related information in the content addressable memory which is to be searched in the initial round of searching, it is acceptable to assign any value as the search related information which is inputted to the content addressable memory when performing the initial round of searching. Or it would also be acceptable to set the same value to all the search related information in the content addressable memory which is to be the object of searching in the initial round of searching, and to the search related information which is inputted to the content addressable memory when performing the initial round of searching.

Since with the present invention the grouped fields and the number of searches information such as the group number etc. are inputted to the content addressable memory all together when performing searching, therefore, even if the stored values relating to different groups in the content addressable memory accidentally match, it is possible to distinguish them. Furthermore, since the search related information such as the rule number etc. are inputted to the content addressable memory together with the grouped fields when searching, therefore, even if the values of the grouped fields relating to different rules which are stored in the content addressable memory accidentally match, it is possible to distinguish them.

Furthermore, with the present invention, when the results of the search result storage device have been read after searching the initial group, if it is necessary to search the next group, since its comparison related information such as its rule number etc. are stored, by again generating the search related information such as the group number and the like, when searching the next group, it is possible to input to the content addressable memory and to search these numbers together with the search object of the next group.

Moreover, if it is not necessary to search the next group, then since only the required action is stored in the search result storage device, therefore it is possible to terminate the search without necessarily searching all the groups.

As described above, with the present invention, the groups of the fields of the rules which are included in the original rule table are stored in the content addressable memory, and, since a single rule comes to be grouped into a plurality of groups and to be stored in the content addressable memory, therefore it becomes possible to store a rule of bit width which is greater than the bit width which can be stored in the content addressable memory.

Accordingly it is possible to perform packet classification searching even with rules of which the width is great, and which have such a very great bit width that, in the background art, it was not possible to perform searching within the limits of a content addressable memory of which the bit width which could be searched was short. Moreover, the access time to the content addressable memory is of the order of 10 nanoseconds, and it thus becomes possible to perform searching of the rule table at an extremely high speed shorter than 32 nanoseconds, which is the time period in which it is necessary to perform searching in order to transmit 40-byte packets upon a 10 Gb/s transmission line.

According to the present invention, it is also acceptable, when grouping the fields which are included in the rules, to determine whether or not there is a possibility of a plurality of grouped fields which are related to the same group matching to specified data, and, if there is a possibility of such matching, for the grouped fields with the exception of that grouped field among the plurality of grouped fields which has the narrowest range, to generate and to insert into the rule table a new rule which has, as contents of the grouped fields for which there is the possibility of matching, the same contents as the grouped field which has the narrowest range, and moreover, as the contents of the grouped fields other than the grouped fields for which there is the possibility of matching and as the action, having the same contents as the rule to which are related the grouped fields; and to store information in the content addressable memory and in the search result storage device based upon a rule table to which the new rule has been added.

By doing this, when grouping the rule table and storing it in the content addressable memory, it is possible to prevent ambiguity from being generated between the rules by the grouping.

BRIEF DESCRIPTION OF THE DRAWINGS

FIG. 3 is an explanatory figure showing an example, in a first preferred embodiment of the present invention, of grouping of fields and rule numbers.

FIG. 4 is an explanatory figure showing an example, for the first preferred embodiment, of storage of data in a content addressable memory and a search result storage device.

FIG. 5 is an explanatory figure showing the basic concept, in the first preferred embodiment, of grouping in a rule table.

FIG. 6 is an explanatory figure showing an example, in the first preferred embodiment, of grouping in a rule table.

FIG. 11 is an explanatory figure showing an example of a rule table according to a second preferred embodiment of the present invention.

FIG. 12 is an explanatory figure for the case in which grouping has been performed for the rule table of FIG. 11.

FIG. 20 is an explanatory figure showing an example of rules for packet classification.

FIG. 23 is an explanatory figure showing an outline of how packet classification searching is performed using a content addressable memory.

DETAILED DESCRIPTION OF THE PREFERRED EMBODIMENTS

Embodiment 1

The present inventors have conceived of making it possible to avoid the above described problems by grouping the rule table in the horizontal direction.

Figure 1:
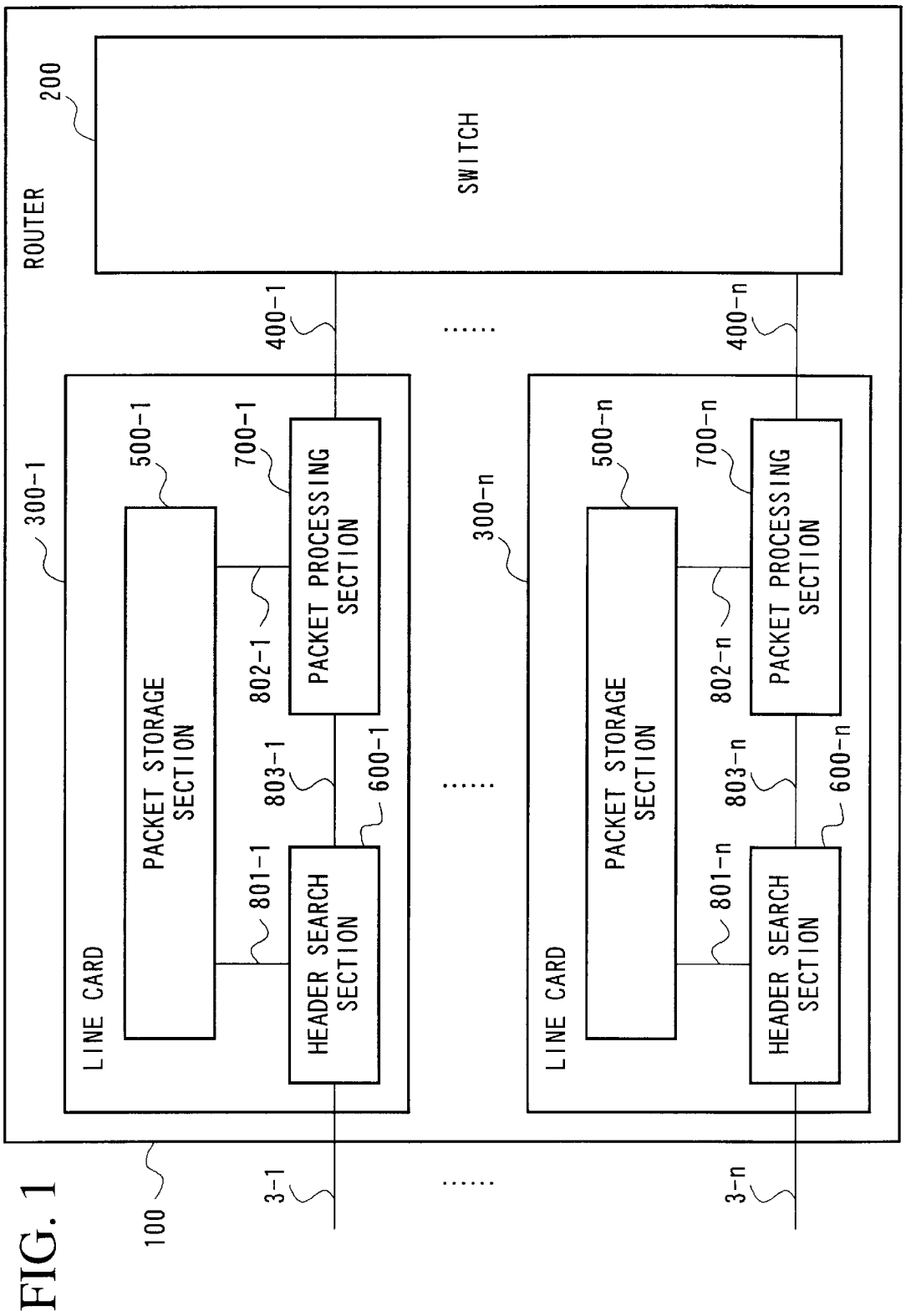
FIG. 1 is a block diagram showing an example of the structure of a router which comprises a packet classification search device according to embodiments of the present invention.

FIG. 1 shows a router 100 which is an example of a device which comprises a packet classification search device according to a first preferred embodiment of the present invention; and in this figure the reference symbol 200 denotes a switch, while the reference symbol 300-1, . . . 300-n are line cards and the reference symbol 400-1, . . . 400-n are signal lines which connect together the switch 200 and the line cards 300-1, . . . 300-n.

Each of the line cards 300-1, . . . 300-n comprises packet storage sections 500-1, . . . 500-n, header search sections 600-1, . . . 600-n, packet processing sections 700-1, . . . 700-n, signal lines 801-1, . . . 801-n which connect together the packet storage sections 500-1, . . . 500-*n* and the header search sections 600-1, . . . 600-*n*, signal lines 802-1, . . . 802-*n* which connect together the packet storage sections 500-1, . . . 500-*n* and the packet processing sections 700-1, . . . 700-*n*, and signal lines 803-1, . . . 803-*n* which connect together the header search sections 600-1, . . . 600-*n* and the packet processing sections 700-1, . . . 700-*n*.

The packet classification search device according to this first preferred embodiment is comprised within the header search sections 600-1 . . . 600-*n*. In the following description, the essentials of how the router 100 processes packets which are inputted will be explained in a simple manner.

If some packet has been inputted from the signal line 3-1, first the header of the packet which has been inputted is searched for by the header search section 600-1, and furthermore the packet itself is forwarded to the packet storage section 500-1 via the signal line 801-1.

The processing which is required for the packet, or the signal line 3-*m* (where 1≦m≦n) which is to be its destination, is determined by the header search performed by the header search section 600-1, and the search result is forwarded to the packet processing section 700-1 via the signal line 803-1, and at the same time the fact that the search has been completed is transmitted to the packet storage section 500-1 via the signal line 801-1. When the packet storage section 500-1, in which the packet itself is stored, is informed that the header search by the header search section 600-1 has been completed, it forwards the packet to the packet processing section 700-1 via the signal line 802-1.

When the search result for the aforesaid packet and the packet itself have been received by the packet processing section 700-1, along with performing the required processing upon the packet, the result of the header search section 600-1, which is the value which identifies the signal line 3-*m* (1≦m≦n) which is to become the destination etc., is appended to the packet, which is then forwarded to the switch 200 via the signal line 400-1. Based upon the above values included in the sent packet which has been received, the switch 200 forwards the aforesaid packet to the line card 300-*m* via the signal line 400-*m*, and the line card 300-*m* forwards this packet to the signal destination 3-*m*.

Figure 2:
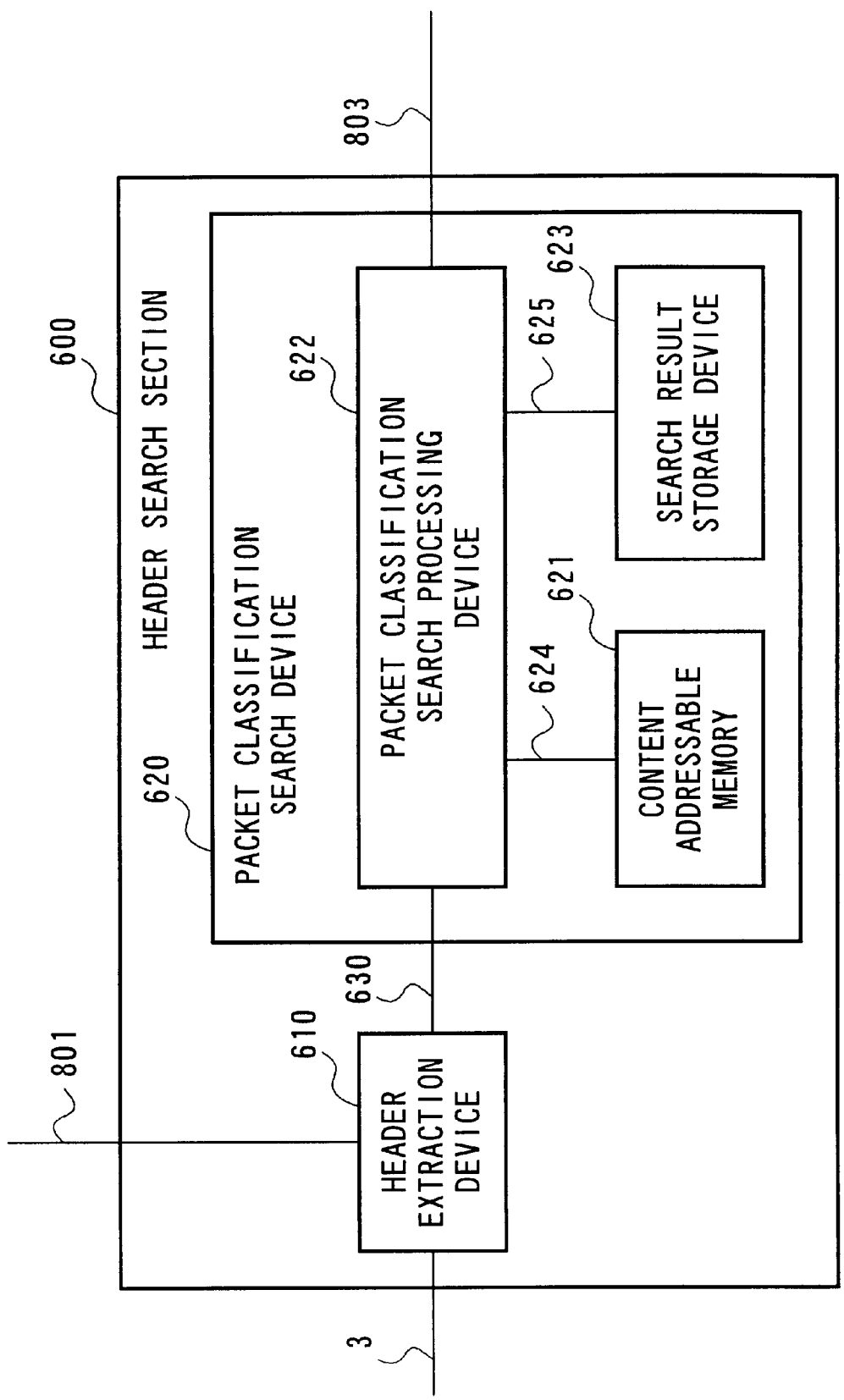
FIG. 2 is a block diagram showing an example of the structure of a header search section which is included in the packet classification search device according to the embodiments of the present invention.

FIG. 2 is a block diagram showing the structure of a packet classification search device according to this first preferred embodiment of the present invention, and in this diagram the packet classification search device is shown by way of example as being assembled to the header search section 600. In the figure, the reference symbol 610 denotes a header extraction device, while the reference symbol 620 is the packet classification search device. The packet classification search device 620 is comprised of a content addressable memory 621, a packet classification search processing device 622, and a search result storage device 623 which is comprised of DRAMs, SRAMs, SSRAMs (synchronous SRAMs), or the like. Furthermore, the reference symbol 624 denotes a signal line which connects together the content addressable memory 621 and the packet classification search processing device 622, while the reference symbol 625 is a signal line which connects together the packet classification search processing device 622 and the search result storage device 623, and 630 is a signal line which connects together the header extraction device 610 and the packet classification search processing device 622.

The overall processing performed by the header search section will now be explained with reference to FIG. 2.

The header extraction device 610 extracts the header from a packet which has been input from the signal line 3, and inputs it to the packet classification search processing device 622 via the signal line 630. At the same time, the header extraction device 610 forwards the packet via the signal line 801 to the packet storage section 500 (refer to FIG. 1). The packet classification search processing device 622 extracts from the header the grouped fields which are necessary for searching, inputs them via the signal line 624 to the content addressable memory 621 and performs searching therein, and receives via the signal line 624 as search result from the content addressable memory 621 the address in the memory of the search result storage device 623 at which the processing for the packet is stored.

The packet classification search processing device 622 forwards the address in the memory of the search result storage device 623 which has been received via the signal line 625, and reads the corresponding processing which is stored in the search result storage device 623 via the signal line 625. If searching for a second time is necessary, the grouped fields which are necessary for the search are extracted from the header and are inputted into the content addressable memory 621, and the address in the memory of the search result storage device 623 is received from the content addressable memory 621, and the corresponding action which is stored in the search result storage device 623 is read out.

This is performed recursively until the search of a single header is completed. When the search of a single header is completed, the final search result (processing) of packet classification is forwarded to the packet processing section 700 (refer to FIG. 1) via the signal line 803, and the fact that the searching of a single header has been completed is notified to the packet storage section 500 via the signal line 801.

FIG. 3 shows an example of the manner of grouping rules based upon the rules which have been explained in FIG. 20 and of appending rule numbers to the rules which have been grouped for searching them.

In the figure, the reference symbols 11*a*, 12*a*, 13*a*, and 14*a* are rule numbers which are appended to the rules 11, 12, 13, and 14 (refer to FIG. 20), while the reference symbols 15 and 16 are two groups into which the fields which are required for packet classification are divided, with numbers (here 0 and 1) being shown as being respectively appended to these groups. The rule numbers which are appended start at 0 and rise by increments of 1 at a time. Since it is necessary for the bit widths of all the groups to be less than or equal to the maximum search bit width which can be searched at one time in the content addressable memory, the method of dividing up the groups is determined so as to satisfy this condition. Moreover, the method of dividing up the groups is determined by the designer in advance.

FIG. 4 expands the rules and the rule numbers of FIG. 3, and shows examples of number of searches information Flags, search related information Srch.Tag (these search tags correspond to the rule numbers in FIG. 3), fields which have been grouped together, next Flags which consist of information for the next round of searching relating to number of searches, Assoc.Tags (association tags) which consist of information related to comparison, and actions, all of which are stored in the content addressable memory 621 and the search result storage device 623.

Reference symbols 11*a*-1, 12*a*-1, 13*a*-1, and 14*a*-1 correspond to group number 0, and store in the content addressable memory number of searches information Flags which have the same value 0 as the group number and fields which correspond to rules numbers 0 through 3; 11*a*-2, 12*a*-2, and 13*a*-2 correspond to rules numbers 0 through 2 of group number 1, and store in the content addressable memory number of searches information Flags which have the same value 1 as the group number, search related information Srch.Tags which have the same values 0 through 2 as the rule numbers, and fields which correspond to rules numbers 0 through 2; 11a-3, 12a-3, 13a-3, and 14a-3 correspond to group number 0, and store next Flags, comparison related information Assoc.Tags which have the same values as the rule numbers, and actions which correspond to rules numbers 0 through 3; and 11a-4, 12a-4, and 13a-4 store actions which correspond to rules numbers 0 through 2 of group number 1. It should be noted that "X" in the figure means that any value that is inputted is acceptable. Furthermore, as will be clear from the above explanation, although in the search related information Srch.Tags and in the comparison related information Assoc.Tags which are appended to a single rule the value of the same rule number (refer to FIG. 3) is set, in this first preferred embodiment of the present invention, the titles may be changed by storing these data fields individually. In other words, the rule numbers which are stored in the content addressable memory 621 are taken as the search related information Srch.Tags, and the rule numbers which are stored in the search result storage device 623 are taken as the comparison related information Assoc..Tags.

Now, the procedures when storing various types of data in the content addressable memory 621 and the search result storage device 623 as shown in FIG. 4 will be explained based upon FIG. 3. First, the rules shown in FIG. 3 are grouped together into two groups numbers 0 and 1. Next, for the group numbered 0 belonging to the rule numbered 0 of, the destination address and the protocol which are the fields are stored in the content addressable memory 621 along with the search number of times information Flag which has the same value 0 as the group number. At this time "*" which means "don't care" is set as the search related information Srch.Tag. This is in order to make all the rules which have 0 as the value of the number of searches information Flag the subject of search when first searching the content addressable memory 621. The data field 11a-1 shown in FIG. 4 is stored in the content addressable memory 621 according to the above procedure.

Next, for the search result storage device 623, the value 1 is set as the next Flag, this value 1 having been obtained by adding 1 to the value 0 of the number of searches information Flag which has been set in the content addressable memory 621. Furthermore, the value 0 which is the same as rule number 0 is set into the comparison related information Assoc.Tag. And moreover, since the value of the number of searches information Flag at this time is not equal to the value which corresponds to the last group, "continue" is set as the action, which indicates that searching in the content addressable memory 621 is to be performed again. And the data field 11a-3, which is the combination of this next Flag, this comparison related information Assoc.Tag, and this action, is stored in the search result storage device 623, as shown in FIG. 4.

For the groups numbered 0 belonging to the rules numbered 1 to 3 as well, the same procedure is performed as described above for the rule numbered 0, and, along with storing the data fields 12a-1, 13a-1, and 14a-1 in order in the content addressable memory 621, the data fields 12a-3, 13a-3, and 14a-3 are stored in order in the search results storage device 623. However, in relation to the rule numbered 3, since the fields of the group numbered 1 are all "don't care" as shown in FIG. 3, it is not necessary to perform searching again in relation to the group numbered 1 belonging to the rule numbered 3. Accordingly, in this case, instead of setting "continue" as the action, the action "deny" which is set in the rule table of FIG. 3 is stored as "action" in the search result storage device 623, and moreover any value is set in the next Flag (in FIG. 4, "X" means that any value is acceptable).

The same procedure is performed for the group numbered 1 as well, just as for the group numbered 0. However, since in this case, as described above all the fields for the rule numbered 3 are "don't care", therefore the procedures for the rules numbered 0 through 2 are performed, and, along with adding the data fields 11a-2, 12a-2, and 13a-2 in order into the content addressable memory 621, the data fields 11a-4, 12a-4, 13a-4, and 14a-4 are added in order into the search result storage device 623. For the content addressable memory 621, the same value 1 as the group number is set for the number of searches information Flag, and, since the group numbered 1 is not the initial group, the rule number which is set in the rule table shown in FIG. 3 is set just as it is as the search related information Srch.Tag. On the other hand, for the search result storage device 623, since the group numbered 1 is the last group, the action which is described in the rule table shown in FIG. 3 is set just as it is as the search result storage device 623, and, since no further searches will be performed for the group numbered 1, any desired values are set into the next Flag and the comparison related information Assoc.Tag.

Using FIG. 4, this packet classification search method will be described in concrete terms for a header in which the destination address is 59.48.1.1, the protocol is TCP, the source address is 122.58.33.1, and the destination port number is 10.

Step 1: The packet classification search processing device 622 extracts the field which comes under the group numbered 0 and the field which comes under the group numbered 1 from the header of the IP packet.

Step 2: The packet classification search processing device 622 inputs to the content addressable memory 621, as search data from the header of the IP packet, the destination address 59.48.1.1 and the protocol TCP, which are the fields of the group numbered 0, the number of searches information Flag which has the same value 0 as the group number 0, and the search related information Srch.Tag which has a suitable value.

Step 3: Since the input data agrees with the data field 12a-1 which is stored in the content addressable memory 621, the packet classification search processing device 622 receives as a result the address in the memory of the search result storage device 623 in which is stored the search result which is related to the data field 12a-1.

Step 4: The packet classification search processing device 622 reads in, from the address in the memory of the search result storage device 623 which it has received, the data field 12a-3 which is stored in the search result storage device 623. Since the contents of the action which is included in the read in data field 12a-3 are "continue", the packet classification search processing device 622 reads in the next Flag and the comparison related information Assoc.Tag, and performs searching again. Since it is found from the data field 12a-3 which has been found and read in by the re-searching action that the next Flag is 1 and the comparison related information Assoc.Tag is also 1, the packet classification search processing device 622 inputs as search data to the content addressable memory 621 the source address 122.58.33.1 and the destination port number 10, which are the fields which come under the group numbered 1 in the header of the IP packet, the number of searches information Flag which has the same value 1 as the group number 1, and the value 1 of the search related information Srch.Tag.

Step 5: Since the input data and the data field 12a-2 which is stored in the content addressable memory are matched by the search, the packet classification search processing device 622 receives as a search result the address in the memory of the search result storage device 623 in which is stored the search result which is associated with the data field 12a-2.

Step 6: The packet classification search processing device 622 reads in the data field 12a-4 which is stored in the search result storage device 623 from the address in the search result storage device 623 which was received. Since the contents of the action which is included in the read in data field 12a-4 are not "continue" but are "forward with medium priority", it is not necessary to perform re-searching, and the search terminates at this point.

Next, a somewhat different manner of implementing the above-described procedure will be explained. As shown in FIG. 5, in order to store rules into a content addressable memory in which the bit width which can be searched is limited, a new rule table (the proposed rule table) is made by grouping the rules of the original rule table into a plurality of blocks, and by storing each block in the content addressable memory. At this time, in order to show which position each block is in the original rule, a number of searches information Flag (a relative position identification flag) is stored together with it. Furthermore, in order to show that each of these blocks belongs to the same original rule, a search related information Srch.Tag and a comparison related information Assoc.Tag is stored together with it. An example of the case of such rule tables which are made up from rules that is comprised of the two fields DA and SA is shown in FIG. 6. It should be understood that, although both of the above mentioned fields DA and SA actually consist of 128 bits, for convenience of explanation, DA and SA will each be shown herein as consisting of 4 bits, since it would be difficult to show their entire 128 bit values in the figure. Furthermore, although the next Flags shown in FIG. 4 are not provided in FIG. 6, since the values of the next Flags may be obtained by adding 1 to the number of searches information Flags which have been inputted to the content addressable memory, it would be acceptable for the packet classification search processing device to perform the requisite additions.

Figure 7:
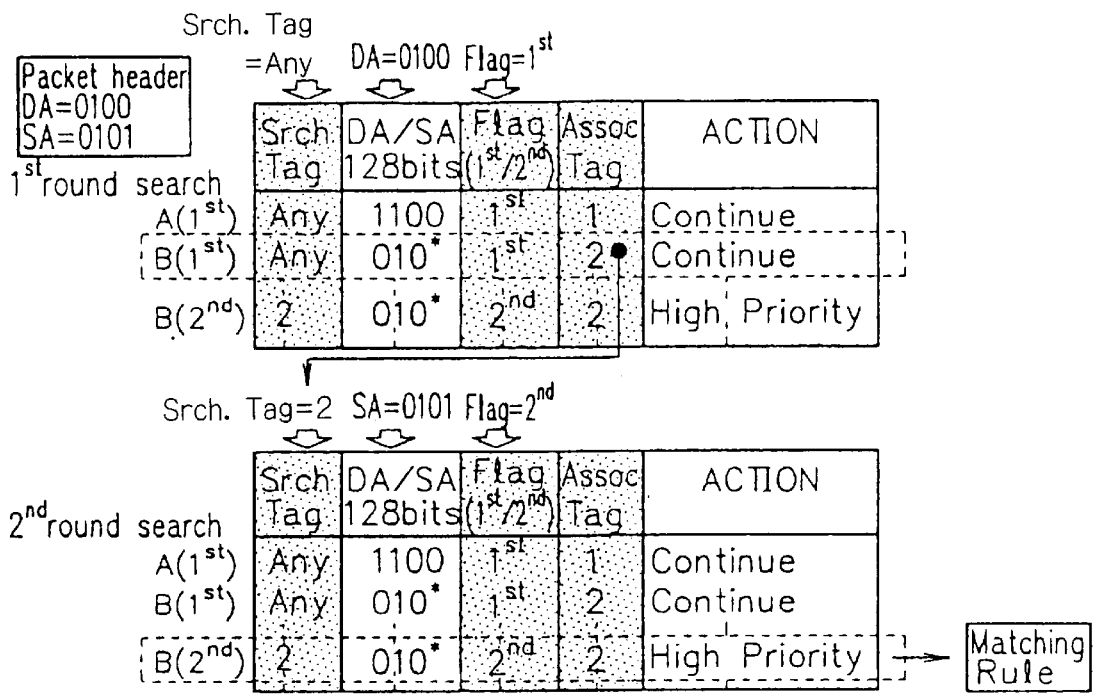
FIG. 7 is an explanatory figure showing an example of search operation for the rule table of FIG. 6.

In relation to the rule table of FIG. 6, in the case that a packet whose header information is DA=0100, SA=0101 arrives, as shown in FIG. 7, in the first round search, searching is performed with DA=0100 as search key, and with the next two search keys combined therewith. As these two search keys, there are the following: the number of searches information Flag which is equal to "$1^{st}$" which shows which round of searching this is, and the search related information Srch.Tag which is equal to "Any" for establishing a relationship with the result of the previous search. It should be understood that, as a value stored as the search related information Srch.Tag, "Any" means "don't care" which agrees with any value. Furthermore, the "any" value of the search related information Srch.Tag which is inputted as a search key means that whatever input value is inputted will be acceptable. As a different mode of implementation, it could be contemplated for all the "Any" values of the search related information Srch.Tag which is inputted as a search key and all the "Any" values of the search related information Srch.Tags in the content addressable memory to be set to the same value. In concrete terms, it would be acceptable, along with setting, for example, 0 as the "Any" value of the search related information Srch.Tags in the content addressable memory, to set the values of the search related information Srch.Tag given to the content addressable memory during the first round of searching to the same value 0.

When a rule is found which matches the first search key, along with it being possible to determine the action which corresponds thereto, which here is "Continue", also the comparison related information Assoc.Tag (equal to 2) which relates to the action is obtained. A subsequent search (the second round search) is performed. At this time, along with the search key SA=0101, searching is performed with the value (equal to 2) of the comparison related information Assoc.Tag which has been obtained by the first round of searching as the search related information Srch.Tag. Furthermore, searching is performed with the number of searches information Flag, which shows the number of this search, equal to "$2^{nd}$". If a rule is found in this second round of searching which matches to these fields, it is possible to determine the action which corresponds thereto—in this case, "forward with high priority".

According to the above explanation, the structural constituents of this first preferred embodiment are:

(1) a means for grouping together the rules of the rule table, and for storing the various portions of these thus grouped rules in a table (in the content addressable memory);

(2) a means for allocating a number of searches information Flag which shows the relative position within the rules before grouping of the various portions of the grouped rules;

(3) a means for allocating a search related information Srch.Tag and a comparison related information Assoc.Tag which show the relations between the various portions of the grouped rules; and:

(4) a means for searching the content addressable memory with the header information, the number of searches information, and the search related information corresponding to the rules as search keys.

It should be understood that, although in order to simplify the explanation given above the example was shown of grouping together as units elements which theoretically makes sense, such as destination address DA, source address SA and the like, the present invention is not to be considered as being limited to this type of embodiment. Since each rule in the rule table may be considered as a mere sequence of bits, it would be acceptable to group the rules in any way which might be convenient; for example, it would be possible to divide the destination address into two groups or more, and (for example) to store 100 bits thereof in group numbered 0, while storing the remaining 28 bits in group numbered 1, or the like. Moreover, if for example the bit width of the content addressable memory 621 is supposed to be 256 bits, then it is possible to utilize the content addressable memory 621 most efficiently by grouping together several rules so that the total number of bits in the number of searches information Flag and the search related information Srch.Tag shown in FIG. 4, and two fields, comes to 256 bits all added together, and it thus becomes possible to minimize the number of times that searching in the content addressable memory 621 must be performed for each packet.

Embodiment 2

In the first preferred embodiment described above, ambiguity in the rules can occur in the type of circumstances described below, and it may happen that correct search operation is not performed. However, in the case of the second preferred embodiment of the present invention, correct search operation can be guaranteed. An example of the circumstances in which ambiguous rules occur is shown in FIG. 8.

Figure 8:
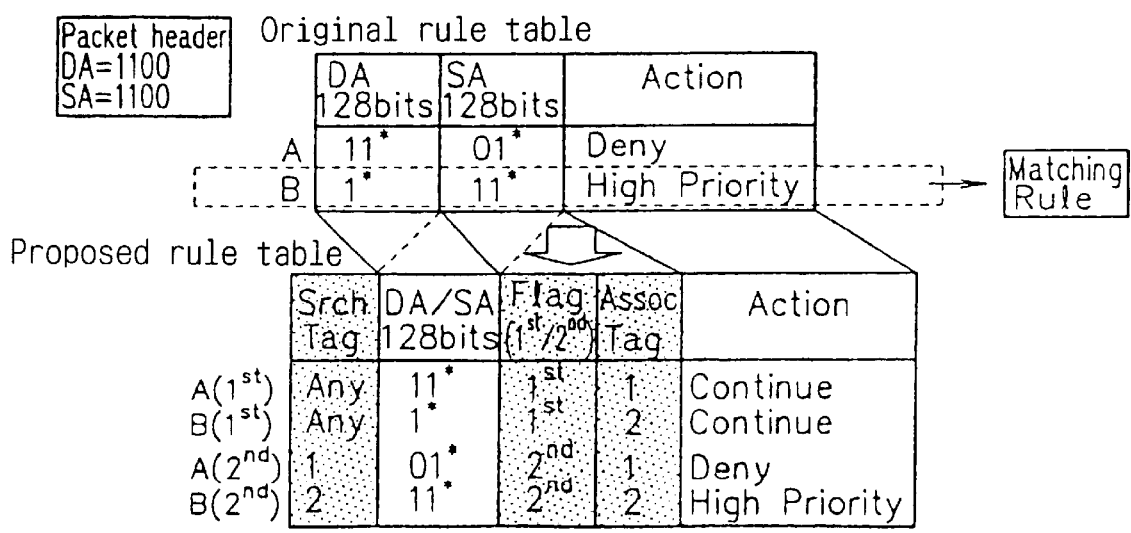
FIG. 8 is an explanatory figure showing an example, in the first preferred embodiment of the present invention, of a rule table in which a problem occurs.

With the rule table which is shown by way of example in FIG. 8, when a packet arrives which has DA=1100 and SA=1100, rule B (DA=1*, SA=11*) should match (here, * denotes "don't care" as described above, and it means that it does not matter whether the subsequent bits are "0" or "1").

Figure 9:
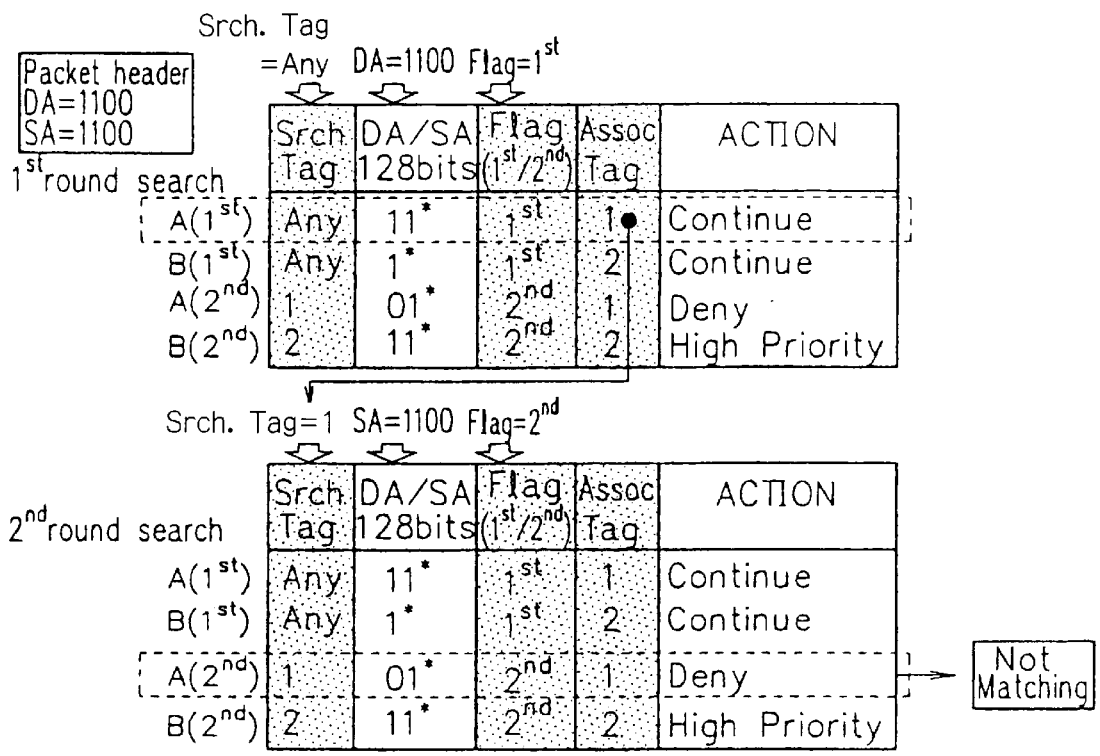
FIG. 9 is an explanatory figure showing an example of search operation for the rule table of FIG. 8.

However, with the first preferred embodiment described above, as shown in FIG. 9, when searching is performed for DA=1100 in the first round of searching, it is decided that the first half portion (DA=11*) of rule A (DA=11*, SA=01*) is a more appropriate match, and the candidate is undesirably narrowed down to rule A. This is because, with the type of content addressable memory which is commercially available, if the data field which has been inputted to the content addressable memory agrees with a plurality of rules, then the physical address of that rule, among those which have agreed, which is stored at the highest position in the content addressable memory (in other words, at the smallest valued address therein) is outputted. Since this happens when performing searching with SA=1100 in the second round of searching, the rule B which is the proper match is overlooked, which is not what is desired.

Figure 10:
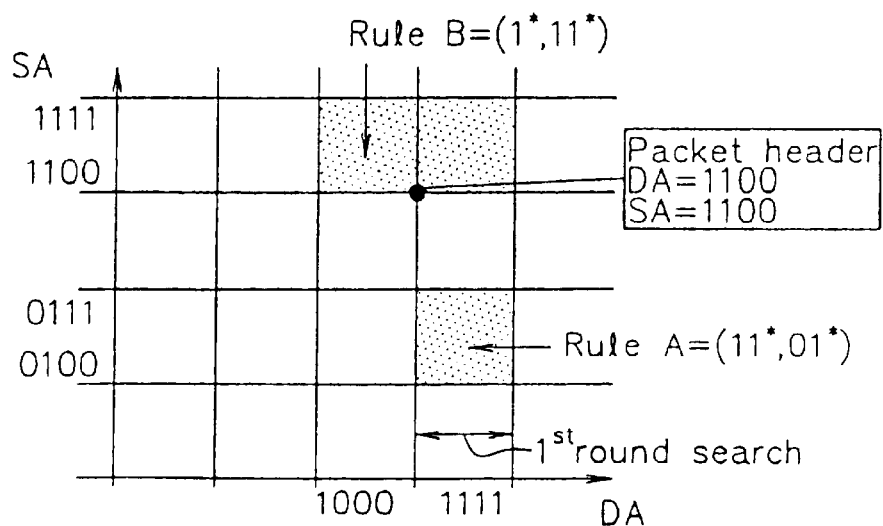
FIG. 10 is a graph showing the general concept of how problems occur during the search operation of FIG. 9.

FIG. 10 shows a conceptual view of this situation. In FIG. 10 DA is plotted along the horizontal axis and SA is plotted along the vertical axis, and this figure shows a region which includes the two rules A and B. The fact that in the first round of searching the candidate is undesirable narrowed down to the rule A, corresponds to the position of the double ended arrow which in FIG. 10 denotes the first round search.

Since DA is searched in the first round search, the search is performed along the horizontal axis in FIG. 10. At this time the candidate is undesirably narrowed down to rule A, since the header information of the packet (DA=1100) is included in the range of the rule A whose range is the narrower.

Since the candidate is undesirably narrowed down to rule A irrespective of the fact that he header information of the packet (DA=1100, SA=1100) can be matched to rule B, when the searching process in the second round search is performed along the vertical axis and the value of SA does not fall within the range of rule A along the vertical axis, the incorrect decision is made that no rule matches.

This second preferred embodiment makes it possible to eliminate the ambiguity that occurs when grouping the rule table according to the first embodiment in the manner described above.

With this second preferred embodiment it is possible to eliminate the ambiguity that occurs when applying the first embodiment, and this result is attained by newly inserting into the original rule table a rule to which the name "guard rule" is applied (also termed a "guard policy").

FIG. 11 shows an example of a rule table according to this second preferred embodiment of the present invention. In the rule table of FIG. 11, by contrast to the case of the rule table of FIG. 8, a rule B' is inserted in order to eliminate the ambiguity that would occur if the first preferred embodiment were to be applied. The rule B' has the same DA as the rule A, while its other portions, in other words the SA and the action, have the same values as in the rule B. By inserting this rule B', it is possible to eliminate the ambiguity which occurs when grouping the rule table.

FIG. 12 shows the grouped version of the original rule table shown in FIG. 11. The point of this grouping is that, when grouping the rule B', it is supposed that the first half portion (the comparison related information Assoc.Tag) of the rule B' of which is used in searching during the first round search is made to be the same as the value (=1) of the comparison related information Assoc.Tag of the rule A. It is important to note that the value of the comparison related information Assoc.Tag of the rule B (which is =2) is not used. By setting the first half portion (the comparison related information Assoc.Tag) of the rule B' to 1, the candidate is no longer narrowed down to the rule A in the first round of searching, so that it is possible to determine in the second round of searching whether the candidate matches with the rule A or matches with the rule B.

It should be noted that, as described above, if the data which is inputted to the content addressable memory matches with a plurality of rules, the smallest physical address is outputted. Furthermore, when adding guard rules, that guard rule is inserted which has the same contents as the rule of the narrower range within the plurality of rules which have matched. Yet further, if a plurality of rules have matched, it is necessary to select that rule whose range is the narrower. Due to this, it is necessary to store the rule with the narrower range at a higher position in the content addressable memory (a position with a smaller physical address) than the rules which have wider ranges than the narrower range rule. Accordingly, as shown in FIG. 11, the rule A and the rule B' are stored in the content addressable memory at higher positions than the rule B.

Figure 13:
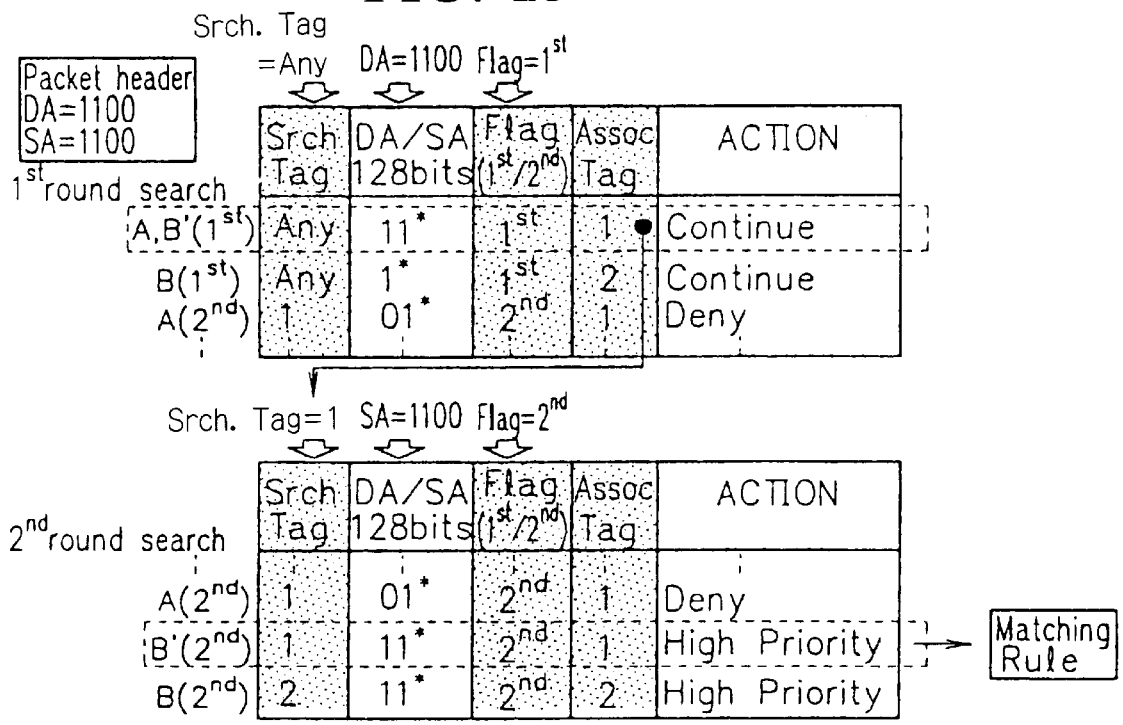
FIG. 13 is an explanatory figure showing an example of search operation for the rule table of FIG. 12.

FIG. 13 shows the situation when performing this search. In FIG. 13, there is shown the situation in which a rule table which has been grouped according to this second preferred embodiment of the present invention is searched two times. In the first round search, the search was performed using the search key DA=1100, and, along with this search key, with the search related information Srch.Tag "Any" and the number of searches information Flag "$1^{st}$" as search keys. The result is that the first half portion of the first row rules A and B' ($1^{st}$) are matched. The comparison related information Assoc.Tag equal to 1 is obtained.

Next, the second round search is performed. At this time, along with the search key SA=1100, the value 1 of the comparison related information Assoc.Tag which was obtained in the first round of searching are used for searching as the search related information Srch.Tag. In the second round of searching, two rules with the value 1 of the search related information Srch.Tag become candidates. These candidates are the rules A and B'. Among these, the rule B' whose search key SA=1100 is the one which matches. By doing this, it is possible to follow the same action as that of rule B, which is the correct decision.

Figure 14:
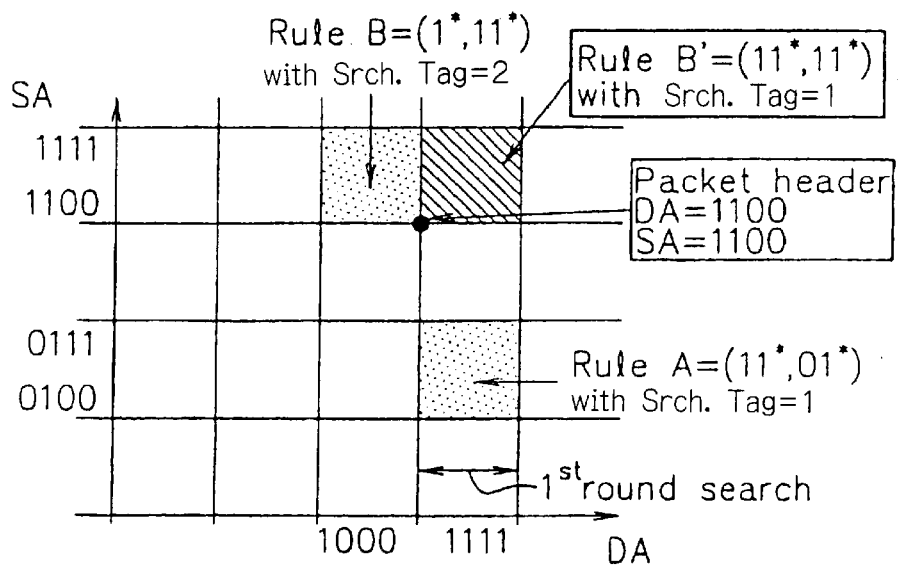
FIG. 14 is a graph showing the basic concept, in this second preferred embodiment, of how problems may be corrected by inserting a guard rule.

FIG. 14 is a figure showing in graphical form a summary of how a guard rule is inserted according to this second preferred embodiment. In the situation shown in the FIG. 10 example in which the rule A and the rule B are present, the rule B' which has the same contents as the rule B is inserted. In FIG. 10, when DA which is plotted along the horizontal axis is considered, the rule B will be seen to cover a wider range than the rule A. In the case of this second preferred embodiment, for DA, the rule B' is inserted which has the same contents as the rule A which has the narrower range, while, for the fields other than DA, this rule B' is made to have the same content as the original rule B. Furthermore, when grouping the rule B', in its first half portion, it is set to have the same value of the search related information as the rule A which was obtained from the result during the first round search (Srch.Tag=1).

Next, the procedures which are followed for storing data in the content addressable memory and the search result storage device will be explained with reference to the flow chart shown in FIG. 15. It should be noted that the explanation herein will be made under the assumption that none of the rules overlap, since, as explained with regard to a third preferred embodiment of the present invention which will be described hereinafter, although it is possible that the range of some rule and the range of another rule may overlap, even if such rules are present it is possible to replace them with rules which do not overlap.

Figure 15:
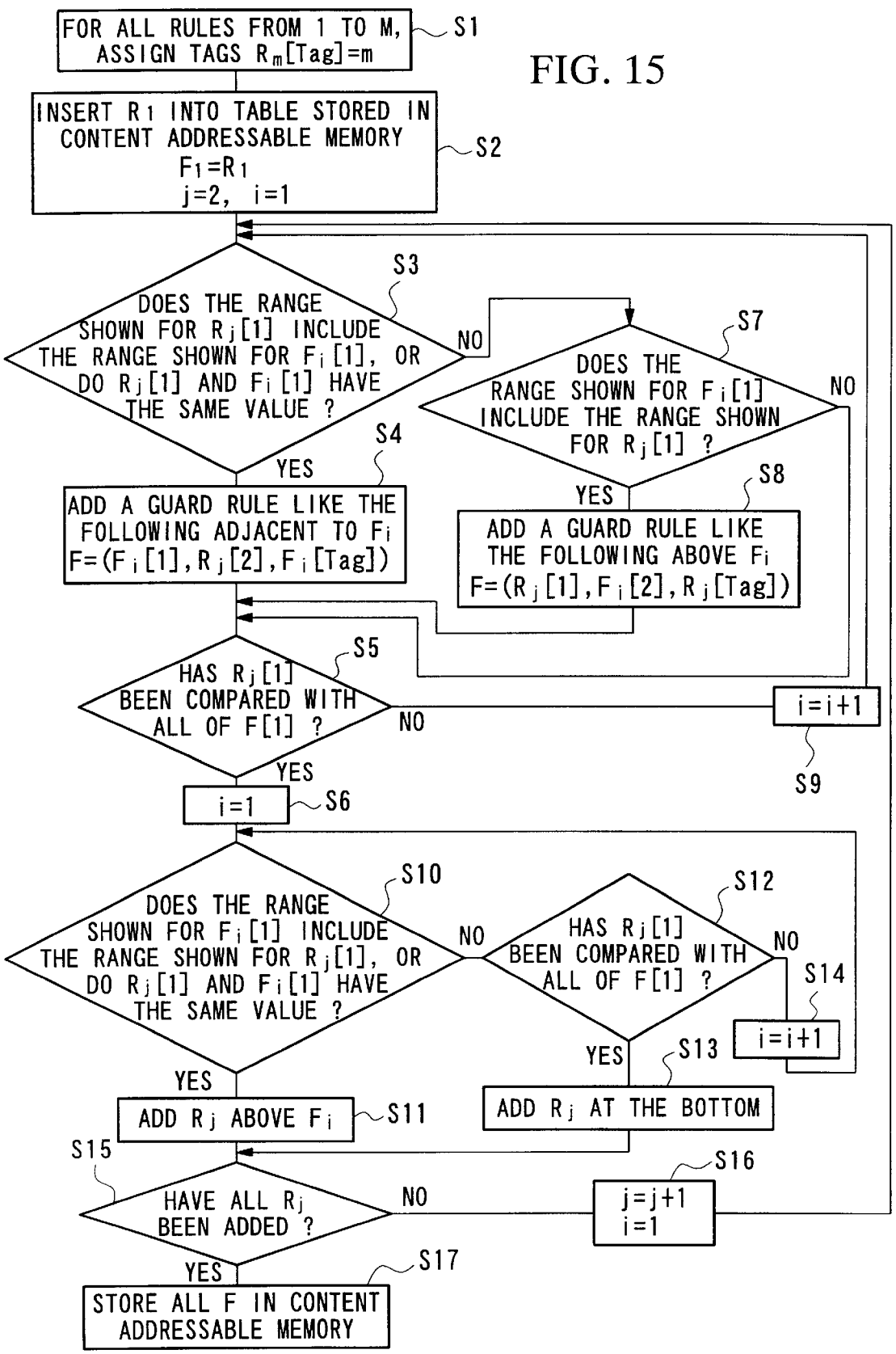
FIG. 15 is a flow chart showing the procedure, in this second preferred embodiment, when storing rules in an original rule table in a content addressable memory.

Since the procedure shown in FIG. 15 is somewhat generalized, the notation used in this figure will first be explained. In the figure, R denotes a collection of rules which are included in the original rule table, and it will be supposed that this is made up from M rules $R_1$ through $R_M$. This collection of rules R is a collection of rules which, as previously hypothesized, have no mutually matching portions. Furthermore, Rj[1] denotes the first field (for example DA) of rule Rj, and in the same manner Rj[2] denotes the second field (for example SA) of rule Rj. Moreover, Rj[Tag] is the search related information of rule Rj. Since as described above the search related information Srch.Tag and the comparison related information Assoc.Tag relating to any single rule basically have the same value, these will be generically termed the tag. F is a collection of rules which are to be written into the content addressable memory, and consists of P rules from $F_1$ to $F_P$. Moreover, the definitions of Fj[1], Fj[2], Fj[Tag] etc. are the same as for the collection R of rules.

Three procedures must be performed before adding the collection R of rules to the content addressable memory. First the tags must be appended, and second, if guard rules are necessary, these must be added. And third, the order when storing the rules in the content addressable memory is decided by taking into account the fact that the highest physical address is outputted if as described above a plurality of rules in the content addressable memory match. In order to implement these three procedures, tags and guard rules are added to the collection R of rules, and moreover the collection F of rules is defined with its order of storage in the content addressable memory being specified, and the collection F of rules is built up based upon the collection R of rules, and it is stored in the content addressable memory.

Next, taking as an example the case of building the proposed rule table shown in FIG. 12 based upon the original rule table shown in FIG. 8, the details of the procedure will be explained following the flow chart of FIG. 15. First, in a step S1, the tags Rm[Tag]=m (for m=1 to M) are assigned for all the rules $R_1$ to $R_M$. By doing this, the search related information Srch.Tag and the comparison related information Assoc.Tag for rule A are both set to 1, while the search related information Srch.Tag and the comparison related information Assoc.Tag for rule B are both set to 2. Next, in a step S2, the rule $R_1$ is added to the collection of rules F, which is a table stored in the content addressable memory. By doing this, the rule A is set as the rule Fl. Furthermore, loop variables i and j are initialized to 1 and 2 respectively.

Next, guard rules are added to the collection of rules F according to requirements, according to the following procedure. For doing this, first in a step S3 a decision is made as to whether or not the range shown for Rj[1] includes the range shown for Fi[1], or Rj[1] and Fi[1] are the same range. It should be noted that, when performing the former decision, it would also be acceptable to decide whether or not the conditions that the minimum value of Rj[1] was less than the minimum value of Fi[1] and the maximum value of Fi[1] was less than the maximum value of Rj[1] were satisfied. In concrete terms, for DA which is the first field, a decision is made as to whether or not rule B includes rule A or whether they both agree with one another. In this case the former relationship of inclusion holds, since the DA of rule B is 1* while the DA of rule A is 11*. Thus in a step S4 the guard rule F=(Fi[1], Rj[2], Fi[Tag]) is added adjacent to the rule Fi. In concrete terms, a rule B' which is made up from the DA (=11*) of rule A, the SA (=1*) of rule B, and the tag (=1) of rule A is added adjacent to the rule A. Next, in a step S5, a decision is made as to whether or not Rj[1] has been compared to all of the F[1]. In this case, since the collection F of rules only consists of the rule $F_1$ (and the guard rule which was added adjacent in the step S4), the result of the decision in this step is YES, and the flow of control proceeds to a step S6. It should be noted that, as described above, it is arranged that, when adding the guard rules to the rule table, if a plurality of rules match, the rule which has the narrowest range is selected by the content addressable memory.

Moreover, if the result of the decision in the step S3 is NO, then in a step S7, in a fashion opposite to the case in the step S3, a decision is taken as to whether or not the range shown for Fi[1] includes the range shown for Rj[1]; and, if this is the case, then in a step S8 a guard rule F=(Rj[1], Fi[2], Ri[Tag]) is added above Fi; this rule is the guard rule added in the step S4 with R and F interchanged. Furthermore, when the result of the decision in the step S7 is NO, so that the inclusion relationship between the range shown for Fi[1] and the range shown for Rj[1] does not hold, then no guard rule is added, and the flow of control is transferred to the step S5. Moreover, if when performing the decision in the step S5 it is decided that a rule other than the rule $F_1$ is present in the collection F of rules (i.e. the result of the decision in the step S5 is NO), then in a step S9 the loop variable i is incremented by 1 and the flow of control returns to the step S3, and subsequently in the same way as described above the processing in the steps S3 through S8 is performed, and thus it is determined whether or not it is necessary to add guard rules which have as objects all of the rules present in the collection F of rules.

Next, the rule Rj itself is added to the collection F of rules according to the following procedure. First, after initializing the loop variable i to 1 in the step S6 above, a decision is made in a step S10 as to whether or not the range shown for Fi[1] includes the range shown for Rj[1] or whether these two agree with one another. In this case, since the range (=11*) of the rule F[1] does not include the range (=1*) of the rule $R_2$[1], the result of the decision in the step S10 is NO, and therefore the flow of control is transferred to a step S12, in which a decision is made as to whether or not Rj[1] has been compared with all of F[1]. Since in this case as well the collection F of rules consists only of the rule $F_1$ and its adjacent guard rule, therefore the flow of control continues to a step S13, in which the rule Rj (in other words, the rule B) is added at the end of the collection F of rules.

It should be noted that, if the result of the decision in the step S10 is YES, then after adding the rule Rj above the rule Fi in a step S11 the flow of control is transferred to the step S15. Furthermore, if the result of the decision in the step S12 is NO, then, in order to perform the comparison of the next rule with the collection of rules F, in a step S14 the loop variable i is incremented by 1, and the flow of control returns to the step S10, and the processing of the steps S10 through S13 is repeated again in the same manner.

Next, after performing the step S13 as described above, in the step S15 a decision is made as to whether or not all of the Rj have been added to the collection F of rules. Since in this case the rule B which was added in the step S13 is the last one in the original table, therefore the flow of control proceeds to a step S17, in which the collection F of rules is grouped according to the procedure explained with regard to the first preferred embodiment and is stored in the content addressable memory. As has been explained above, when adding the rule Rj to the rule table as well, in the same manner as in the case of adding a guard rule, it is arranged that if a plurality of rules match, the rule which has the most narrow range is selected by the content addressable memory. Moreover, if the result of the decision in the step S15 is that there still remain some rules which have not yet been added, then in a step S16 the loop variable j is incremented by 1 and the next rule is selected, and also the loop variable i is initialized to 1 in the same way as described above the processing in the step S2, and the flow of control returns to the step S3 and the same processing as described above is performed for the rule $R_3$ and following.

As will be understood from the above explanation, when grouping the rules, it is possible to resolve the problem of ambiguity when grouping rules which have the problematical point associated with the first preferred embodiment by, if there is an inclusion relationship between blocks which correspond to different rules, inserting a guard rule which has the same details as the block of the rule which has the narrower scope.

In order to simplify the explanation of the above second preferred embodiment, the foregoing discussion was limited to the case of a rule table in which the rules are made up from the two elements DA and SA, but the same concepts could be applied in the same manner to a rule table which was made up from three or more elements.

Furthermore although, in order to simplify the explanation of the above second preferred embodiment, the foregoing discussion was limited to the case of the number of rules between which the inclusion relationship holds was limited to the case of two, but the same concepts could be applied in the same manner to a rule table in which an inclusion relationship held between three or more rules. If three or more such rules are present, then there is a possibility of matching with three or more rules, and, although three or more rules may be obtained as candidates, in this case as well it will be sufficient to add guard rules only to the extent that they are obtained as candidates.

Yet further, although in order to simplify the explanation of the above second preferred embodiment the explanation was focused upon the case of grouping rules the essential elements of whose details were independent (e.g., DA and SA), it would also be possible to apply the present invention to the case of grouping rules with the same essential elements, as well.

Embodiment 3

Figure 16:
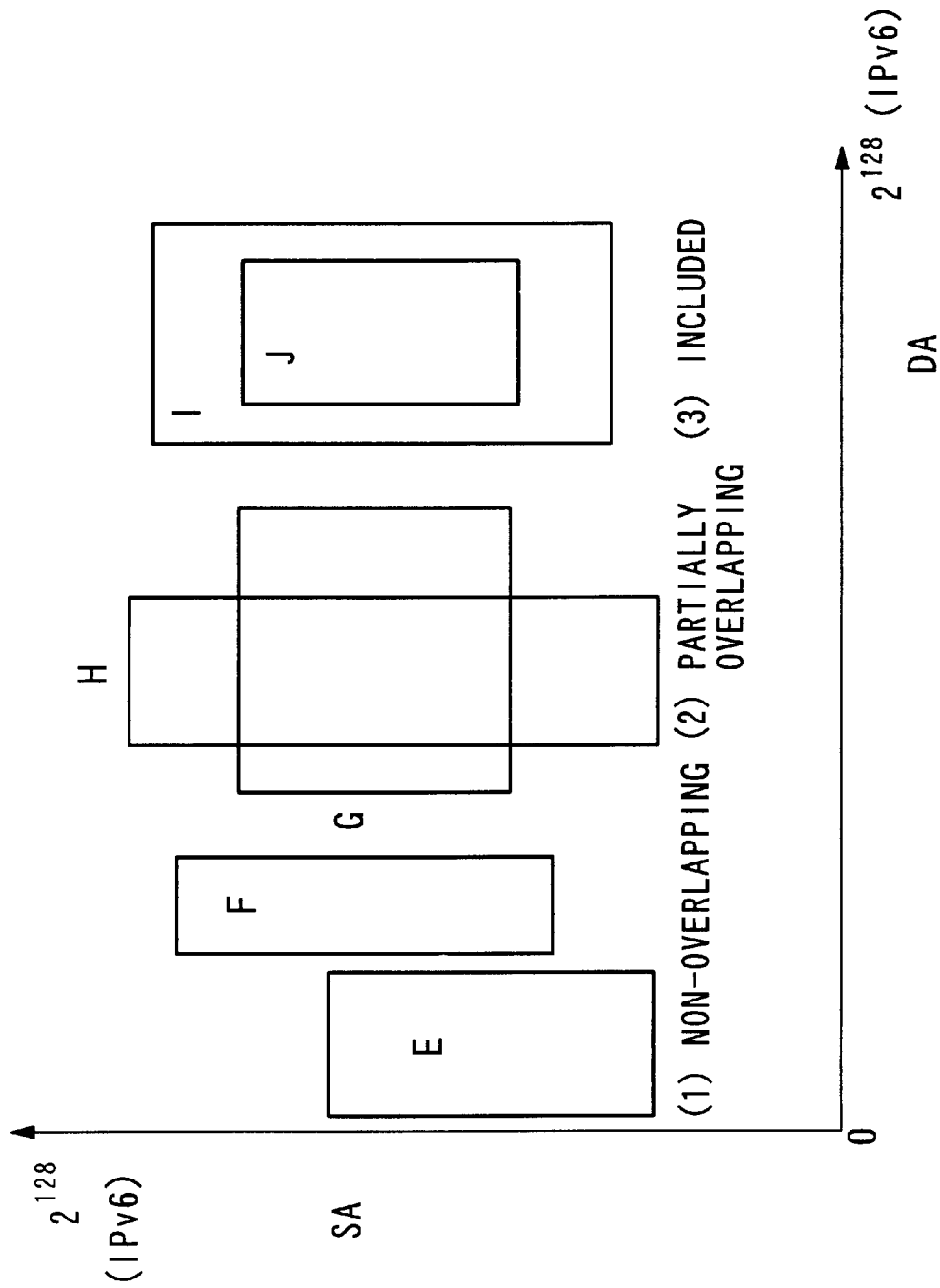
FIG. 16 is an explanatory figure showing, in a third preferred embodiment of the present invention, three types of relationship between two rules.

In this third preferred embodiment of the present invention, as touched upon in the above description of the second preferred embodiment, appropriate procedures are performed as required if some of the rules overlap. The relationship between two rules in the original rule table can be subdivided into three different cases, as shown in FIG. 16. It should be understood that, in order to facilitate explanation, in the figure it has been supposed that the rules are two dimensional ones which are made up from conditions upon DA and SA, but no loss of generality is implied by this hypothesis. In the first case, the relationship between the rules E and F is one of "non-overlapping". Furthermore, in the second case, the relationship between the rules G and H is that of "Partially overlapping". And, in the third case, the relationship between the rules I and J is that of inclusion, with the rule I including the rule J; in other words, the range of one of these rules (rule J) is completely included within the range of the other of these rules (rule I).

Figure 17:
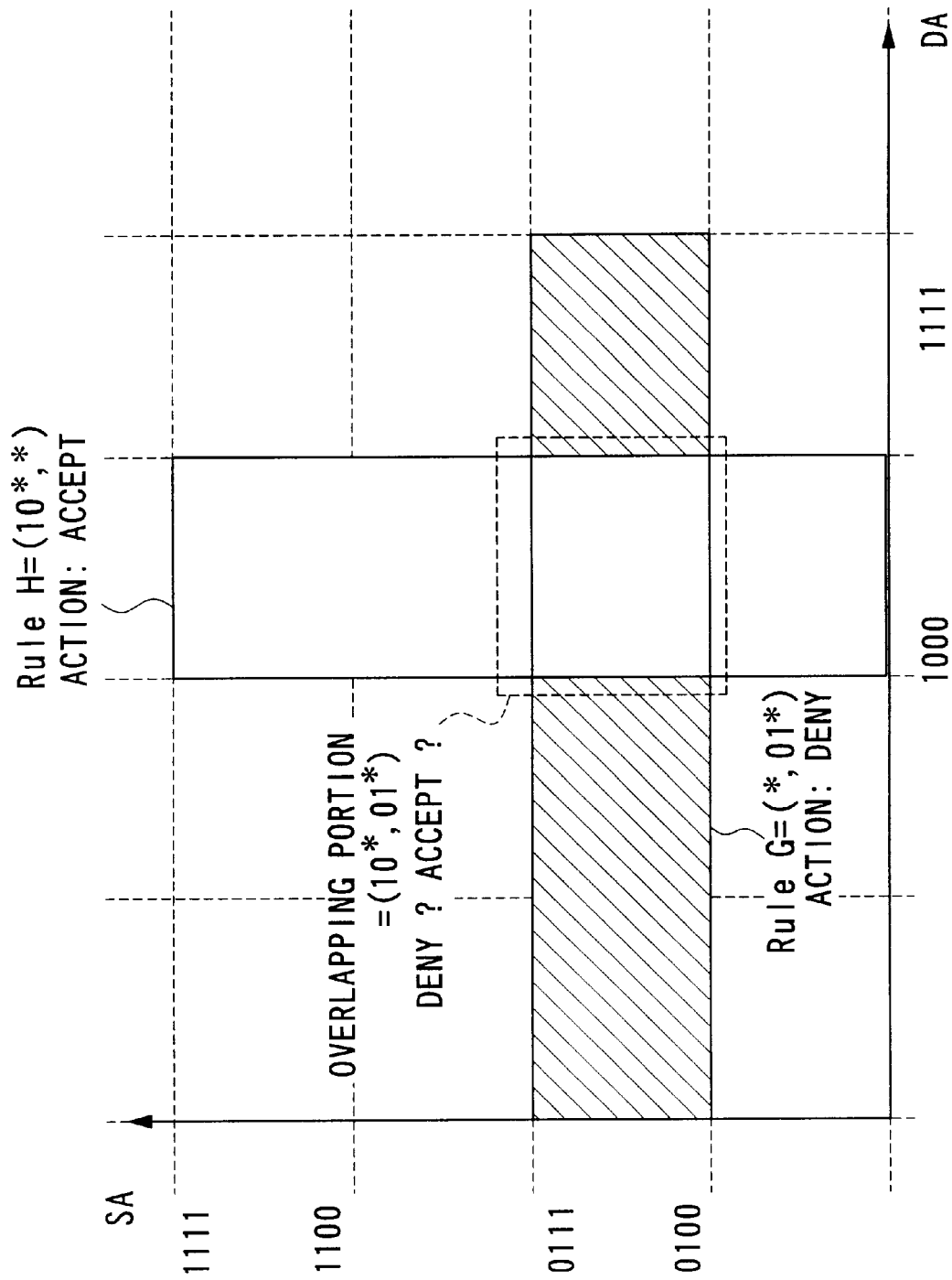
FIG. 17 is an explanatory figure showing, in the third preferred embodiment, the gist of how portions of two rules can overlap.

Although, between two rules which partially overlap, it is ambiguous which of the two partially overlapping procedures should be performed, it is certainly necessary to choose a procedure according to one or the other of the rules. For this, a maintenance administrator should explicitly set the procedure related to the partially overlapping portion into the packet classification search device. Now it will be hypothesized, as shown in FIG. 17, that the following two rules are present: a rule G=(*, 01*) which has "deny" as its action, and a rule H=(10*, *) which has "accept" as its action (in other words, an action other than "deny", such as "forward with high priority", "forward with medium priority", or "forward with low priority"). In this case, for the rule (10*, 01*) which is the overlapping portion between these two rules, the maintenance administrator should decide upon which of the actions "deny" and "accept" should be employed, and should set this decision into the packet classification search device.

Figure 18:
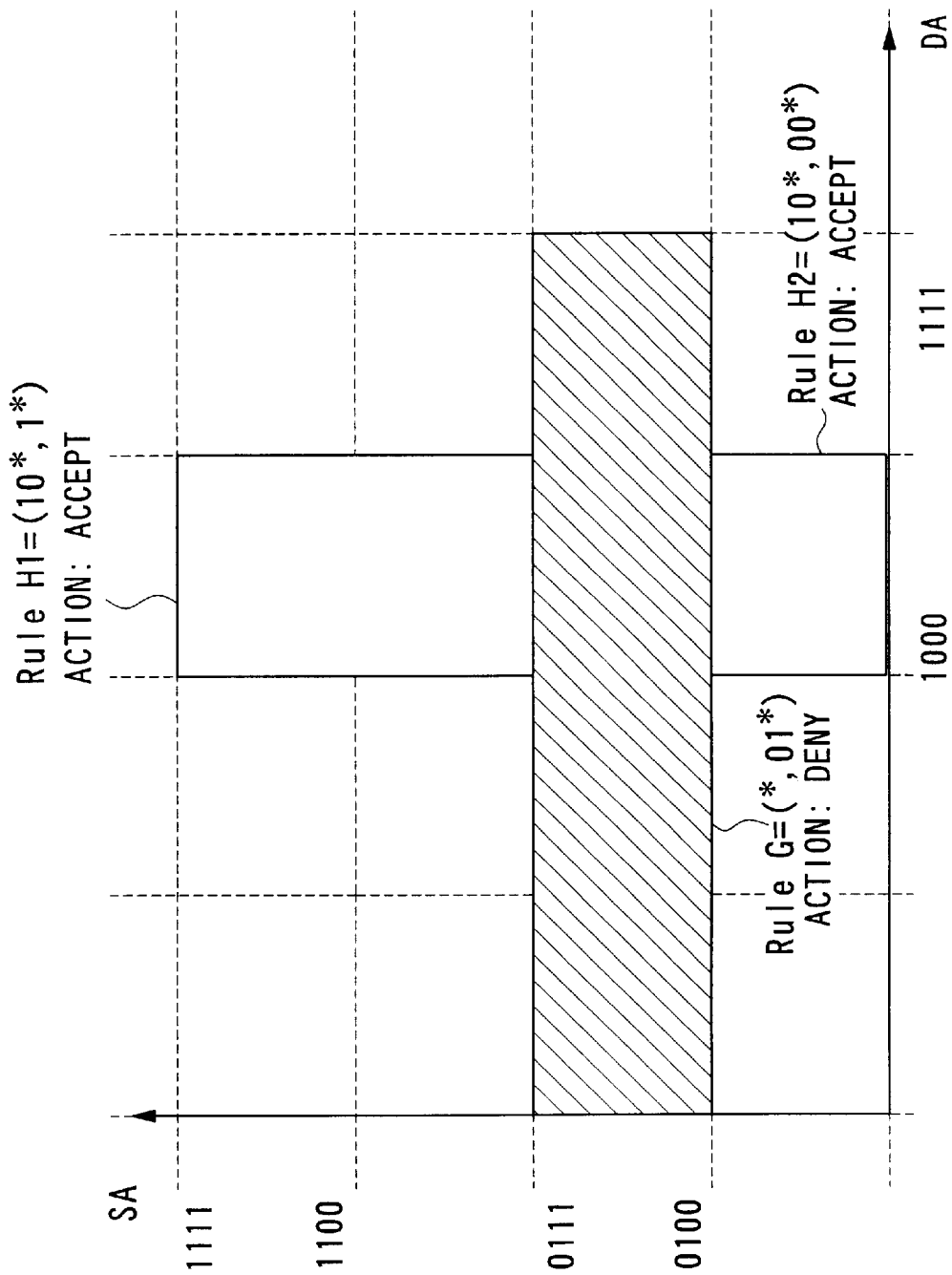
FIG. 18 is an explanatory figure showing, in the third preferred embodiment, the gist of how, when as shown in FIG. 17 portions of two rules overlap, one of these rules is divided.
Figure 19:
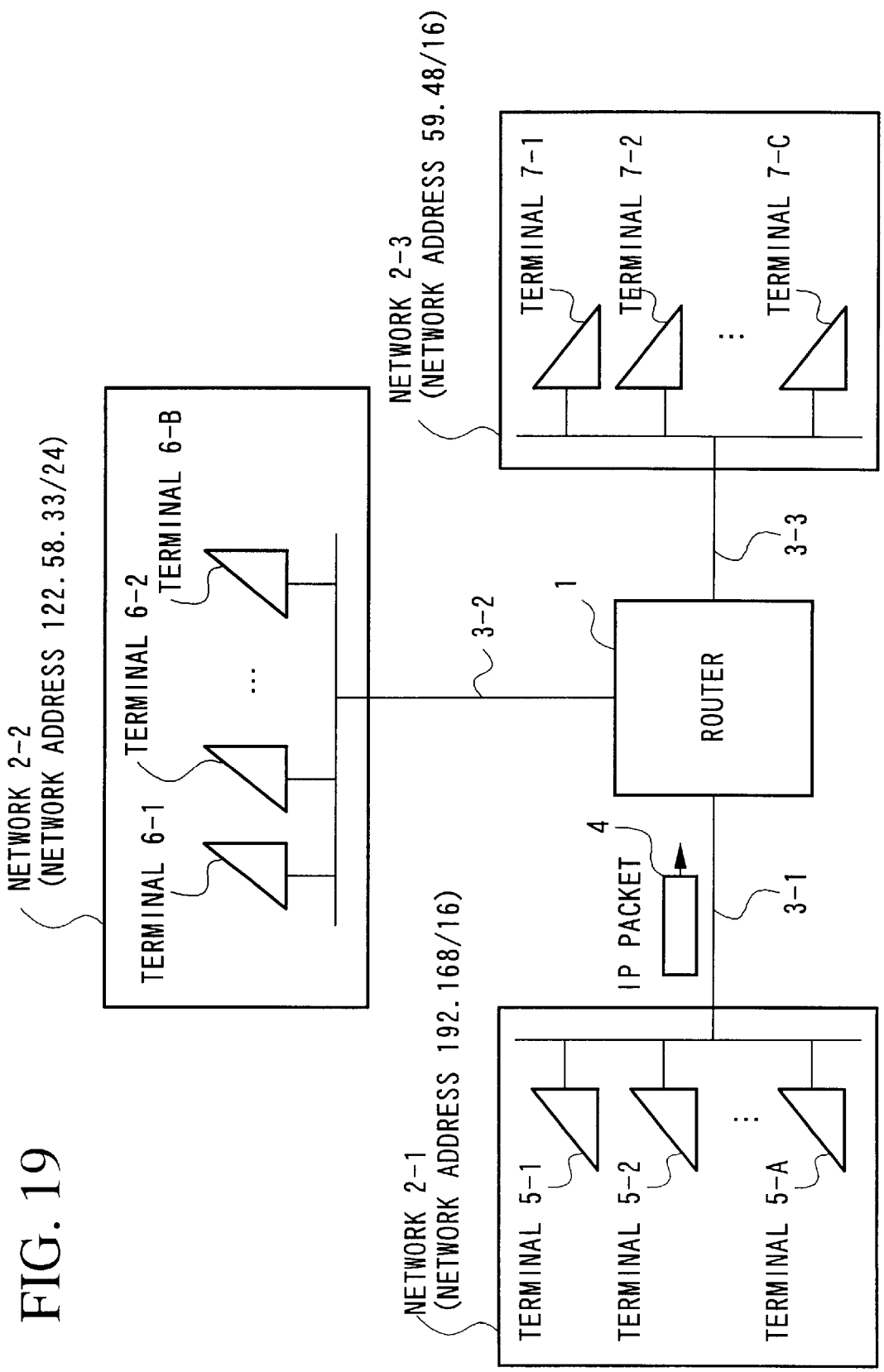
FIG. 19 is an explanatory figure showing an outline of how IP packets are transmitted.
Figure 21:
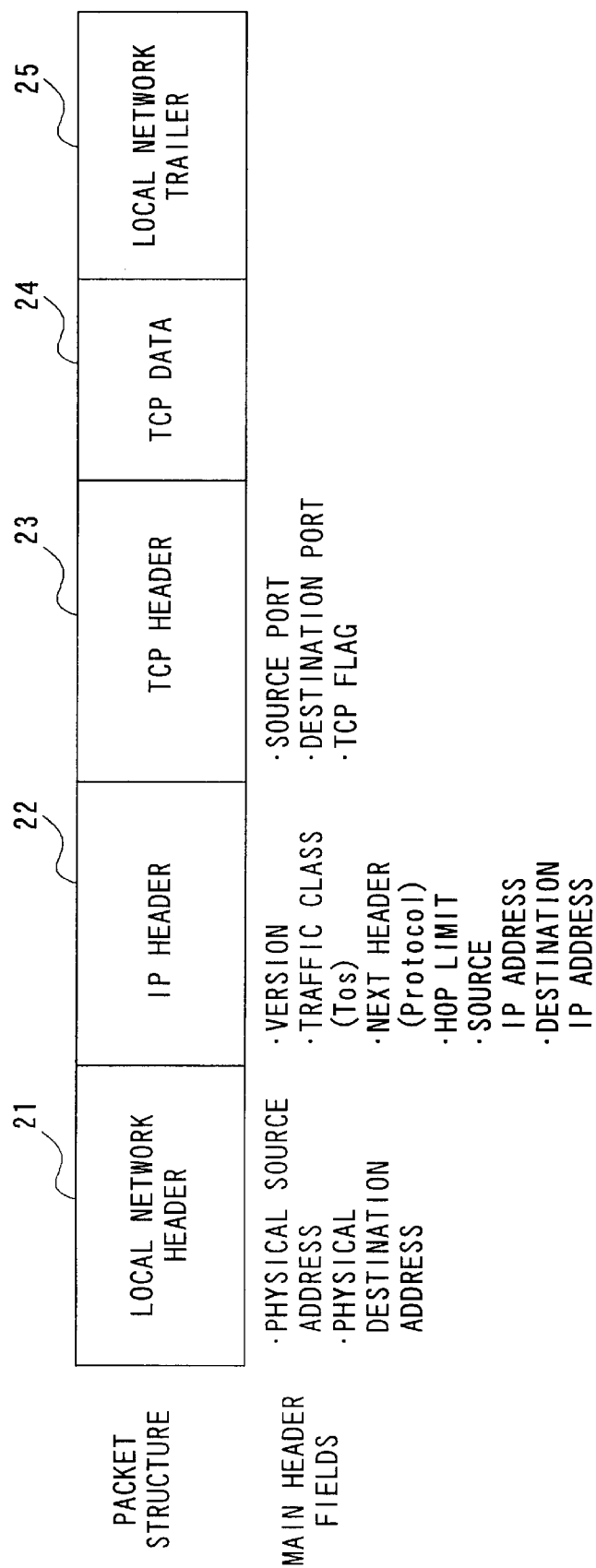
FIG. 21 is an explanatory figure showing an example of IP packet structure and main header information.
Figure 22:
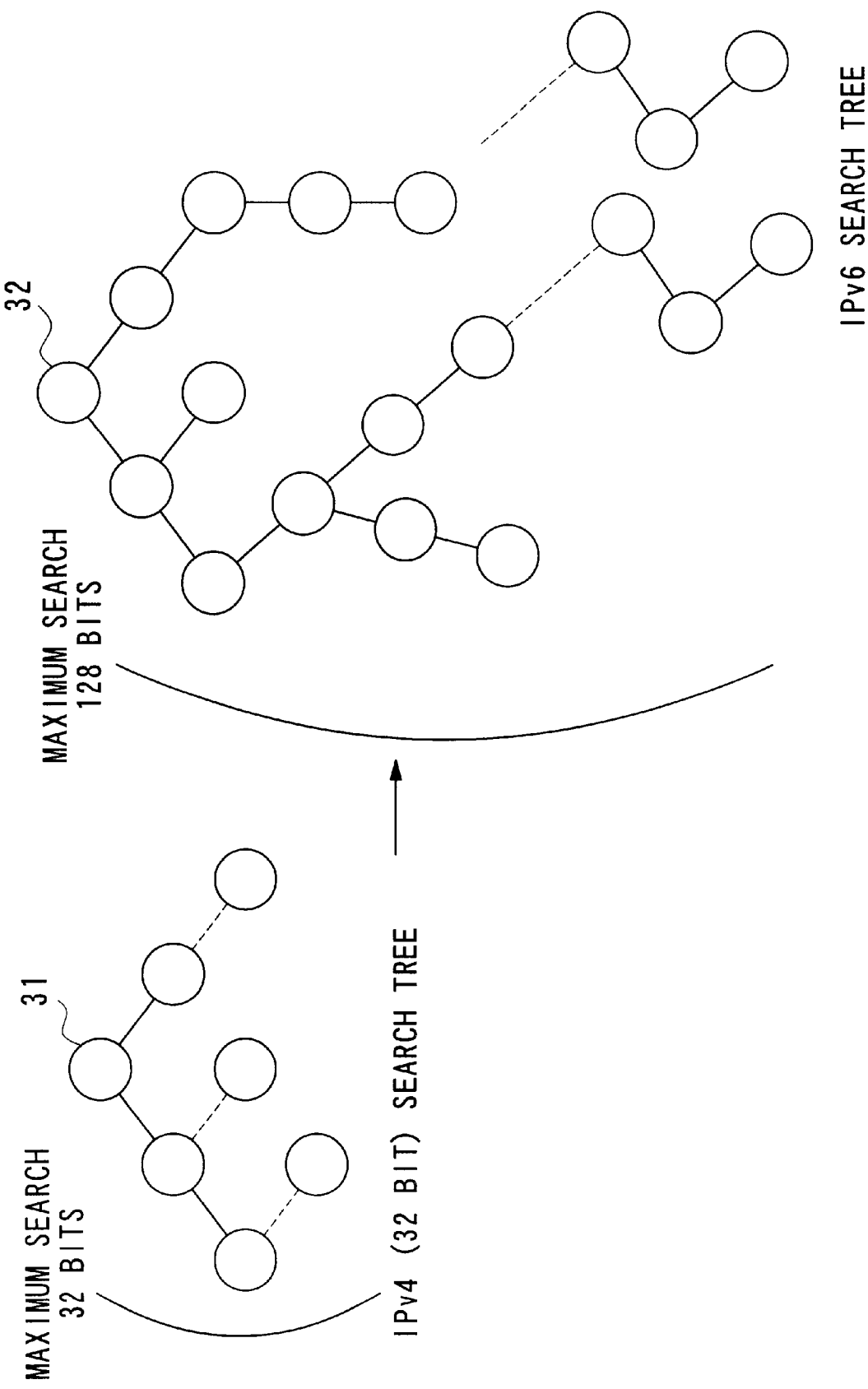
FIG. 22 is an explanatory figure showing examples of tree structure.

In the case of a collection of rules of which portions overlap, for example in the case of two rules which partially overlap, it is possible to create a collection of rules which do not overlap by dividing one of the rules into several rules. It is possible to solve the problem of ambiguity described above in this manner. FIG. 18 shows an example of dividing the rule H which is shown in FIG. 17 into two. In FIG. 18, it is supposed that the action which should be implemented for the overlapping portion is the action according to the rule G, so that, by splitting the rule H into the two rules H1 and H2, a collection of rules G, H1, and H2 is obtained which do not mutually overlap. It should be noted that, in the case of two rules between which the relationship of inclusion holds (the case (3) in FIG. 16) as well, it is possible to convert the collection of rules so that no overlap occurs, by performing division in an analogous manner to the procedure the case of partial agreement described above.

What is claimed is:

1. A packet classification search device which, based upon fields included in packets which are used to classify the flow of said packets, searches through a rule table comprising a plurality of rules which combine said fields and actions to be performed in relation to packets of which the flow is classified by said fields, and determines actions to be performed in relation to said packets, comprising:

a content addressable memory which combines and stores grouped fields which have been grouped from fields included in said rules into a plurality of groups determined in advance, and number of searches information and search related information which respectively show the groups and the rules to which said grouped fields are related;

a search result storage device which stores, in correspondence to said combinations which are stored in said content addressable memory, actions which are to be performed when combinations of grouped fields, number of searches information and search related information that have been inputted to said content addressable memory are found in said content addressable memory, and comparison related information which show the rules to search when next searching in said content addressable memory; and:

a processing device which: extracts said fields from packets which have been inputted and generates said grouped fields; inputs into said content addressable memory and searches said number of searches information and said search related information which show the groups and rules which should be searched, and said grouped fields which correspond to said groups;

obtains said actions and said comparison related information which are stored in said search result storage device in correspondence to combinations which have been searched in said content addressable memory; and, until the details of the actions which are to be performed as said actions upon said packets are obtained, again inputs to said content addressable memory said number of searches information which shows the groups which should next be searched, said grouped fields which correspond to said groups, and said comparison related information which has been obtained, and performs said searching again.

2. A packet classification search device according to claim 1, wherein said processing device groups said fields which are included in the rules in said rule table and generates said grouped fields; generates said number of searches related information, said search related information, and said comparison related information based upon the rules and the groups which are related to the grouped fields which have been generated, and, along with combining said number of searches information, said search related information, and said grouped fields which have been generated and storing them in said content addressable memory, combines and stores in said search result storage device said comparison related information which has been generated and said actions which are included in the rules which said comparison related information shows.

3. A packet classification search device according to claim 2, wherein said processing device allocates group numbers to said groups in advance as number of searches information in order to identify said groups, and combines and stores in said content addressable memory said grouped fields and said group numbers which have been allocated to groups to which said grouped fields are related.

4. A packet classification search device according to claim 2, wherein said processing device determines, for each rule, a rule number for identifying said rules as said search related information and said comparison related information; in relation to the group which is initially to be the subject of search for a packet which has been inputted, combines and stores in said content addressable memory said grouped fields and said search related information which is set by data which matches any rule number; and, in relation to the groups other than said group which is initially to be the subject of search, combines and stores in said content addressable memory said grouped fields and said rule numbers which have been allocated to rules to which said grouped fields are related.

5. A packet classification search device according to claim 4, wherein said processing device: when the next group which is required for searching the content addressable memory in relation to said combinations stored in said content addressable memory exists, combines and stores in said search result storage device the rule numbers which are allocated to the rules which should be searched when next searching said content addressable memory, and actions which direct searching said content addressable memory again; and, when the next group which is required for searching the content addressable memory in relation to said combinations does not exist, stores in said search result storage device the actions which are to be performed upon packets which are inputted.

6. A packet classification search device according to claim 2, wherein said processing device, when grouping said fields which are included in said rules, determines whether or not there is a possibility that the plurality of grouped fields which are related to the same group may match to specified data, and, if there is a possibility of such matching, for said grouped fields with the exception of the grouped field among said plurality of grouped fields whose range is the narrowest, generates and adds to said rule table a new rule which has the same contents as those of said grouped field of which the range is the narrowest as the contents of said grouped fields for which there is a possibility of matching, and which has the same contents as the rule to which said grouped fields are related as the grouped fields other than the grouped fields for which there is a possibility of matching and as the action, and stores information in said content addressable memory and in said search result storage device based upon a rule table to which said new rule has been added.

7. A packet classification search device according to claim 6, wherein said processing device, when grouping fields which are included in said new rule, sets the contents of said comparison related information which is stored in said search result storage device to be the same as the comparison related information which is stored in said search result storage device in correspondence to the grouped field which has the narrowest range.

8. A packet classification search device according to claim 6, wherein: if the combination of said grouped fields, said number of searches information, and said search related information which has been inputted matches a plurality of combinations which are stored in said content addressable memory, said content addressable memory selects from among the physical addresses at which said plurality of combinations are stored and outputs as search result according to some predetermined standard;

and if, during searching after expanding and storing the rule table to which said new rule has been added in said content addressable memory and said search result storage device, the combination of said grouped fields, said number of searches information, and said search related information which have been inputted into said content addressable memory matches a plurality of combinations which are stored in said content addressable memory, said processing device inserts said new rule into said rule table so that said content addressable memory outputs as search result the physical address which contains the grouped field which has the narrowest range from among the grouped fields which are included in said plurality of combinations.

9. A packet classification search device according to claim 2, wherein said processing device determines whether or not, among the rules in said rule table, there are present a plurality of rules the ranges of whose fields mutually overlap, and, if such a plurality of rules are present, for those rules among said plurality of rules excluding certain rules which are determined in advance, obtains ranges which do not overlap by excluding the range of overlap from the range of fields which are included in said rules, generates new rules corresponding to said ranges which do not overlap and replace said plurality of rules with said new rules, and stores information in said content addressable memory and in said search result storage device based upon a rule table in which said rules have been replaced.

10. A packet classification search device according to claim 1, wherein said fields are grouped so that the sum of the bit widths of said number of searches information, said search related information, and said grouped fields which are stored at each physical address of said content addressable memory agrees with the bit width of said content addressable memory.

11. A packet classification search method, which, based upon fields included in packets which are used to classify the flow of said packets, searches through a rule table comprising a plurality of rules which combine said fields and actions to be performed in relation to packets of which the flow is classified by said fields, and determines actions to be performed in relation to said packets, comprising the steps of:

a step of providing a content addressable memory to combine and store grouped fields which have been grouped from fields included in said rules into a plurality of groups determined in advance, and number of searches information and search related information which respectively show the groups and the rules to which said grouped fields are related, and of providing a search result storage device which stores, in correspondence to said combinations which are stored in said content addressable memory, actions which are to be performed when combinations of grouped fields, number of searches information and search related information that have been inputted to said content addressable memory are found in said content addressable memory, and comparison related information which show the rules to search when next searching in said content addressable memory;

a step of extracting said fields from packets which have been inputted and generating said grouped fields;

a step of inputting into said content addressable memory and searching said grouped fields which correspond to said groups which are to be initially searched and number of searches information which designates said groups;

a step of obtaining said actions and said comparison related information which are stored in said search result storage device in correspondence to search results which have been outputted from said content addressable memory;

a step of, if the action which has been obtained shows re-searching of said content addressable memory, again inputting number of searches information which shows the groups which should next be searched, said grouped fields which correspond to said groups and search related information which has the same contents as said comparison related information which has been obtained to said content addressable memory and performing searching; and a step of, if said actions show details of actions which are to be performed upon the packets which are inputted, terminating the searching of said content addressable memory and outputting said details of said actions.

12. A packet classification search method according to claim 11, further comprising:

a step of, when grouping said fields which are included in said rules, determining whether or not there is a possibility of a plurality of grouped fields which are related to the same group matching to specified data, and, if there is a possibility of such matching, for said grouped fields with the exception of the grouped field among said plurality of grouped fields which has the narrowest range, generating and inserting into said rule table a new rule which has the same contents as those of the grouped field which has the narrowest range as contents of the grouped fields for which there is a possibility of matching, and which has the same contents as the rule to which said grouped fields are related as the contents of the grouped fields other than said grouped fields for which there is a possibility of matching and as the action; and a step of storing information in said content addressable memory and in said search result storage device based upon a rule table to which said new rule has been added.

13. A packet classification search method according to claim 11, further comprising:

a step of determining whether or not among the rules in said rule table there exist a plurality of rules of which the ranges of the fields which are included in said rules mutually overlap, and, if such a plurality of rules exist, for said rules among said plurality of rules with the exception of a previously determined rule, obtaining ranges in which there is no overlap by excluding the range of overlap from the range of fields which are included in said rules, and generating new rules which correspond to said range in which there is no overlap to replace said plurality of rules with said new rules; and a step of storing information in said content addressable memory and in said search result storage device based upon a rule table into which said rules have been replaced.

* * * * *